(12) United States Patent
Omura et al.

(10) Patent No.: US 11,128,013 B2
(45) Date of Patent: Sep. 21, 2021

(54) BATTERY MODULE

(71) Applicant: Panasonic Intellectual Property Management Co., Ltd., Osaka (JP)

(72) Inventors: Tetsuji Omura, Osaka (JP); Akira Takano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 244 days.

(21) Appl. No.: 16/305,140

(22) PCT Filed: Jun. 21, 2017

(86) PCT No.: PCT/JP2017/022775
§ 371 (c)(1),
(2) Date: Nov. 28, 2018

(87) PCT Pub. No.: WO2018/012224
PCT Pub. Date: Jan. 18, 2018

(65) Prior Publication Data
US 2019/0334145 A1    Oct. 31, 2019

(30) Foreign Application Priority Data

Jul. 11, 2016 (JP) .............................. JP2016-136612
Aug. 31, 2016 (JP) .............................. JP2016-169873

(51) Int. Cl.
*H01M 50/342* (2021.01)
*H01M 50/20* (2021.01)
*H01M 50/50* (2021.01)

(52) U.S. Cl.
CPC ....... *H01M 50/3425* (2021.01); *H01M 50/20* (2021.01); *H01M 50/50* (2021.01)

(58) Field of Classification Search
None
See application file for complete search history.

(56) References Cited

U.S. PATENT DOCUMENTS

| 4,994,334 | A | 2/1991 | Ikoma et al. |
| 7,201,994 | B2 | 4/2007 | Watanabe et al. |
| 2012/0114993 | A1 | 5/2012 | Park et al. |
| 2013/0089763 | A1 | 4/2013 | Lee |
| 2014/0220391 | A1 | 8/2014 | Fujii et al. |

(Continued)

FOREIGN PATENT DOCUMENTS

| CN | 102468463 A | 5/2012 |
| CN | 203631621 U | 6/2014 |

(Continued)

OTHER PUBLICATIONS

International Search Report of PCT application No. PCT/JP2017/022775 dated Aug. 8, 2017.

(Continued)

*Primary Examiner* — Sarah A. Slifka
(74) *Attorney, Agent, or Firm* — McDermott Will and Emery LLP

(57) ABSTRACT

A battery module includes a battery and a covering put over a surface of the battery. The surface of the battery is provided with a valve to release gas produced inside the battery. The covering includes a thin-walled part and a thick-walled part disposed in a region contiguous to the thin-walled part. The thin-walled part is formed thinner in thickness than the thick-walled part.

7 Claims, 16 Drawing Sheets

(56) References Cited

U.S. PATENT DOCUMENTS

2014/0329115 A1   11/2014  Fink et al.
2015/0372354 A1   12/2015  Nakano et al.

FOREIGN PATENT DOCUMENTS

| JP | 2-227966    | 9/1990  |
|----|-------------|---------|
| JP | 2012-104471 | 5/2012  |
| JP | 2013-084558 | 5/2013  |
| JP | 2016-046163 | 4/2016  |
| WO | 2012/147150 | 11/2012 |
| WO | 2013/031613 | 3/2013  |
| WO | 2014/122905 | 8/2014  |

OTHER PUBLICATIONS

English Translation of Chinese Office Action dated Mar. 24, 2021 for the related Chinese Patent Application No. 201780039218.X.

BATTERY MODULE

CROSS-REFERENCE TO RELATED APPLICATIONS

This application is a U.S. national stage application of the PCT International Application No. PCT/JP2017/022775 filed on Jun. 21, 2017, which claims the benefit of foreign priority of Japanese patent application 2016-136612 filed on Jul. 11, 2016 and Japanese patent application 2016-169873 file on Aug. 31, 2016, the contents all of which are incorporated herein by reference.

TECHNICAL FIELD

The present invention relates to a battery module.

BACKGROUND ART

It is known that a battery module made up of a plurality of batteries connected in series serves as a power supply for vehicles or other uses that require high output voltage, for example. Such a battery module typically includes a cover on a top surface of a battery assembly to protect output terminals of batteries, bus bars, and other components. PTL 1 discloses a structure in which a separator, a component of a battery assembly, is provided with a locking hook, and a cover is fixed to the battery assembly by fastening the cover to a lug-shaped tip of the locking hook.

Batteries incorporated in conventional battery modules are provided with safety valves to release gas produced in any of the batteries to an outside of the battery if pressure of the gas has exceeded a predetermined threshold level. PTL 2 discloses a battery pack having a structure to release gas from an interior of a battery. In the structure, a cover put over a plurality of batteries includes a degassing cover put over vents of the batteries and a cover plate above the degassing cover. A part of the degassing cover is lower in stiffness than the cover plate. According to a technique disclosed in PTL 2, the battery pack controls the flow of gas by ensuring that the degassing cover with lower stiffness preferentially ruptures in case of release of a large amount of gas from any of the vents.

CITATION LIST

Patent Literature

PTL 1: WO 2013/031613 A
PTL 2: Unexamined Japanese Patent Publication No. 2013-84558

SUMMARY OF THE INVENTION

In recent years, battery modules have been required to offer higher output voltages. To satisfy this demand, numbers of batteries stacked in battery modules are on the increase. Meanwhile, any battery in a battery module in use can swell. If the number of batteries in a battery assembly increases, an expansion amount of the entire battery assembly increases. A great swell of the battery assembly may cause unsatisfactory fastening of the locking hook to the cover, leading to a decrease in reliability of the battery module.

The conventional battery modules have room for improvement in safety.

The present invention has been accomplished in light of this situation. It is an object of the present invention to provide a technique for preventing a decrease in reliability of a battery module and for improving safety of the battery module.

A battery module is provided in accordance with an aspect of the present invention. The battery module includes a battery and a covering put over a surface of the battery. The surface of the battery is provided with a valve to release gas produced inside the battery. The covering includes a thin-walled part and a thick-walled part disposed in a region contiguous to the thin-walled part.

A battery module according to another aspect of the present invention includes a battery assembly incorporating a plurality of stacked batteries, a covering put over a surface of the battery assembly, and a fastener to fix the covering to the battery assembly. The battery assembly has a first insertion hole that is designed for insertion of the fastener. The covering includes a step portion and a second insertion hole. The step portion includes a first segment extending at a level relatively near to the surface of the battery assembly and a second segment extending at a level relatively remote from the surface of the battery assembly. The second insertion hole is disposed in the first segment. The second insertion hole is designed for insertion of the fastener. The fastener is inserted into both the first insertion hole and the second insertion hole so that the battery assembly and the covering are fixed to each other.

The present invention improves safety of a battery module and prevents a decrease in reliability of the battery module.

DESCRIPTION OF EMBODIMENTS

Figure 1:
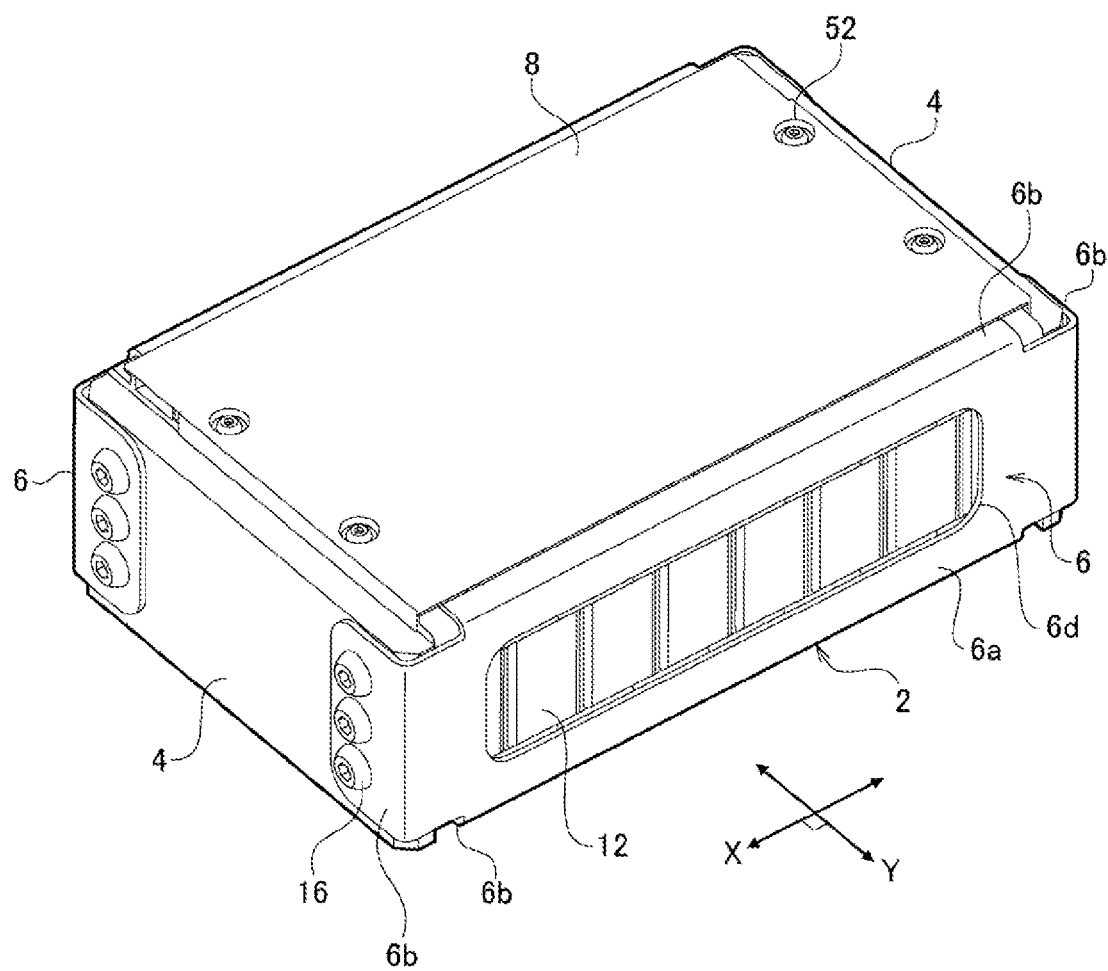
FIG. 1 is a schematic perspective view illustrating a structure of a battery module according to a first exemplary embodiment.

Hereinafter, the present invention will be described based on preferred exemplary embodiments with reference to the drawings. The exemplary embodiments are exemplifications and should not limit the invention. All the features described in the exemplary embodiments and a combination thereof are not necessarily essential to the invention. Identical reference marks are assigned to identical or equivalent components, members, processes illustrated in the drawings, and the overlap description thereof is omitted as appropriate. Further, scales or shapes of parts illustrated in the drawings are conveniently set to facilitate the description, and should not be interpreted restrictively unless otherwise mentioned. Even identical members may slightly differ from each other in scale or extent between the drawings. Additionally, the terms "first", "second", and the like used in the present description and claims should not represent any order or importance, but are intended to distinguish between one configuration and another configuration.

First Exemplary Embodiment

A battery module according to a first exemplary embodiment is summarized as below. The battery module according to the first exemplary embodiment includes batteries that each have a valve on a surface of the battery to release gas produced inside the battery and a covering put over the surfaces of the batteries. The covering includes thin-walled parts disposed face-to-face with the valves and a thick-walled part disposed in a region contiguous to the thin-walled parts.

The battery module according to the first exemplary embodiment further includes a partition member disposed between the surfaces of the batteries and the covering and wires that are disposed between the partition member and the thick-walled part and that are connected to the batteries. The partition member has openings at locations corresponding to the valves and first walls projecting toward the covering and surrounding the respective openings. The first wall is at least partly disposed between the wires and the valve.

In the battery module according to the first exemplary embodiment, the thin-walled parts are thinner in thickness than the first walls.

Figure 2:
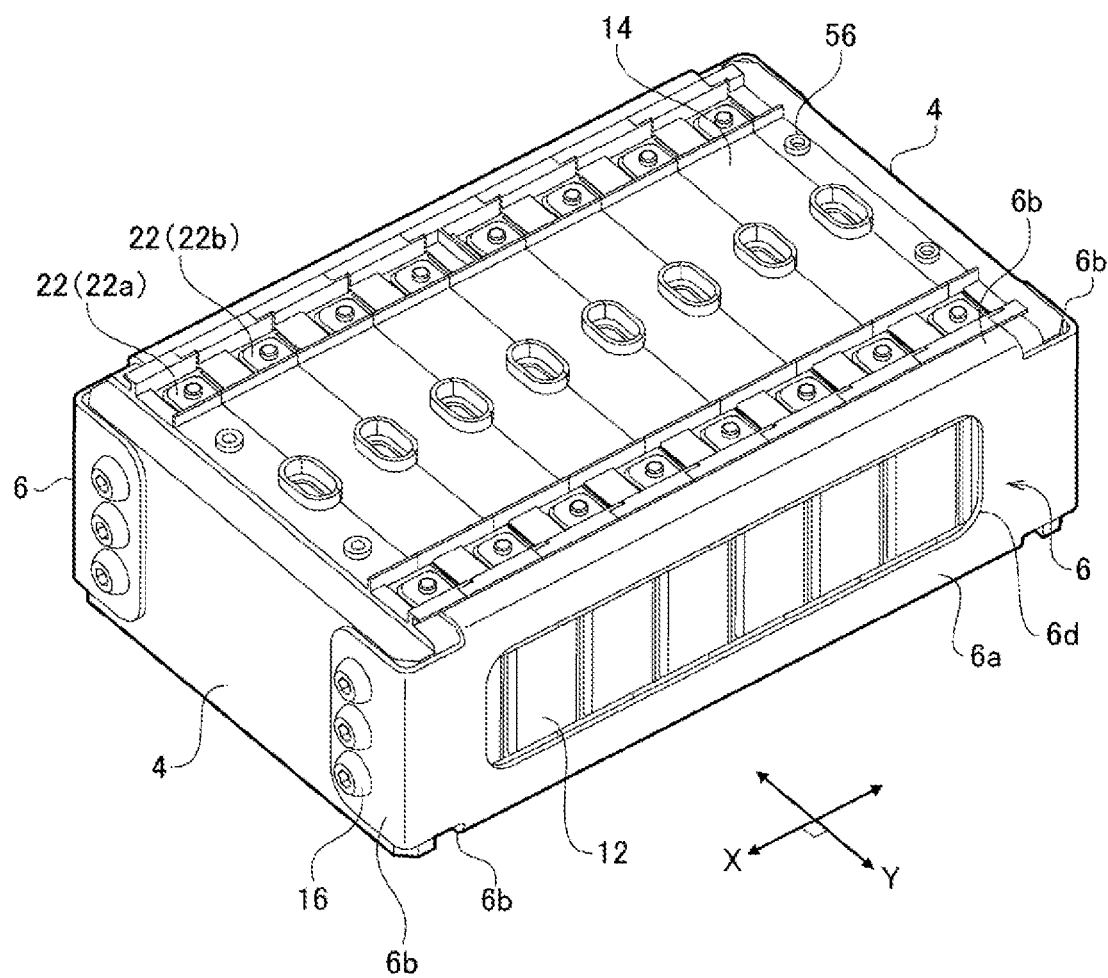
FIG. 2 is a schematic perspective view illustrating a structure of a battery assembly.

FIG. 1 is a schematic perspective view illustrating a structure of the battery module according to the first exemplary embodiment. FIG. 2 is a perspective view of the battery module from which the covering is removed.

Battery module 1 includes battery assembly 2, covering 8, and fasteners 52. Battery assembly 2 includes a plurality of batteries 12, a plurality of separators 14, a pair of end plates 4, and a pair of restraint members 6. In the present exemplary embodiment, for example, eight batteries 12 are connected in series by bus bars (not shown), whereby battery assembly 2 is formed.

For example, each battery 12 is a rechargeable secondary battery, such as a lithium ion battery, a nickel-hydrogen battery, or a nickel-cadmium battery. Battery 12 is a so-called prismatic battery. The plurality of batteries 12 is stacked at predetermined intervals such that main surfaces of adjacent batteries 12 face each other. The "stack" herein denotes that a plurality of components is arranged in any one direction. Thus, the scope of "stacked batteries 12" includes cases in which the plurality of batteries 12 is arranged in a horizontal direction.

Two adjacent batteries 12 are arrayed such that positive-electrode output terminal 22 (positive electrode terminal 22a) of one of batteries 12 is adjacent to negative-electrode output terminal 22 (negative electrode terminal 22b) of the other of batteries 12. Hereinbelow, when there is no need to distinguish polarities of output terminal 22, positive electrode terminal 22a and negative electrode terminal 22b are collectively referred to as output terminal 22. Positive electrode terminal 22a and negative electrode terminal 22b that are adjacent to each other are electrically connected in series via a bus bar. The bus bar is a strip-shaped metal plate, for example. One end of the bus bar is electrically connected to positive electrode terminal 22a of one battery 12, and another end of the bus bar is electrically connected to negative electrode terminal 22b of other battery 12.

The plurality of separators 14 are also called insulating spacers and are each formed of a resin having an insulation property, for example. Separator 14 is disposed between batteries 12 and between battery 12 and end plate 4.

The plurality of batteries 12 and the plurality of separators 14 that are stacked together are put between the pair of end plates 4. The pair of end plates 4 is disposed such that the end plates are adjacent to outermost batteries 12 via respective separators 14 in stacking direction X of batteries 12 (a direction shown with arrow X in FIGS. 1 and 2). End plate 4 is made of a metal plate, for example, and is insulated from battery 12 by being adjacent to battery 12 via separator 14. A main surface of end plate 4 is provided with screw holes (not shown) into which fastening screws 16 are screwed.

The pair of restraint members 6 is arrayed in direction Y (a direction shown with arrow Y in FIGS. 1 and 2) perpendicular to stacking direction X of batteries 12. An assemblage of the plurality of batteries 12, the plurality of separators 14, and the pair of end plates 4 is disposed between the pair of restraint members 6. Restraint member 6 has rectangular plane 6a parallel to a side surface of the assemblage and eaves part 6b protruding from an end of each side of plane 6a toward the assemblage. Restraint member 6 can be formed by folding each side of a rectangular metal plate, for example. Through holes (not shown) into which fastening screws 16 are inserted are provided at two eaves parts 6b facing each other in stacking direction X of batteries 12. Plane 6a is provided with opening 6d to expose the side surface of the assemblage. Preferably, opening 6d is disposed such that influence of the opening on rigidity of restraint member 6 against external force in stacking direction X of batteries 12 is reduced to a minimum. This configuration allows restraint member 6 to come down in weight while maintaining rigidity. Restraint member 6 may be provided with a plurality of openings as needed.

Covering 8 is also called a top cover and is disposed so as to cover a surface of battery assembly 2 adjacent to output terminals 22 projecting from batteries 12. Covering 8 prevents condensed water, dust, and other foreign matter from coming into contact with parts such as output terminals 22 of batteries 12, the bus bars, and valves 24 described later. Covering 8 is a component that constitutes a part of an outer shell of battery module 1.

Fastener 52 is a component for fixing covering 8 to battery assembly 2. In the present exemplary embodiment, fastener 52 is configured of fastening screws, for example. A detailed description will be given later of how covering 8 is fixed to battery assembly 2 by fastener 52.

Battery module 1 is assembled as follows, for example. In other words, first, the plurality of batteries 12 and the plurality of separators 14 are alternately arrayed, and are sandwiched by the pair of end plates 4. Accordingly, an assemblage is formed. Then, the pair of restraint members 6 is mounted on this assemblage. The assemblage partly enters a space surrounded by four eaves parts 6b of each restraint member 6 (refer to FIG. 7). Each restraint member 6 is aligned such that the through holes of the member overlap screw holes of end plate 4. In this state, fastening screws 16 are inserted into the through holes and are screwed into the screw holes, respectively. As a result, the plurality of batteries 12 and the plurality of separators 14 are fastened by the pair of end plates 4 and the pair of restraint members 6.

The plurality of batteries 12 is positioned in stacking direction X of batteries 12 by being fastened in stacking direction X by restraint members 6. Further, the plurality of batteries 12 is positioned in a vertical direction by making the bottom surface of the batteries abut on lower eaves part 6b of restraint member 6 via separators 14 and by making the top surface abut on upper eaves part 6b of restraint member 6 via separators 14 (refer to FIG. 7). In this state, the bus bars are electrically connected to output terminals 22 of batteries 12 and hence battery assembly 2 is obtained. Subsequently, covering 8 is attached to a top surface of battery assembly 2 and is fixed to the battery assembly by fastener 52. Battery module 1 is obtained from the above-described process.

Figure 3:
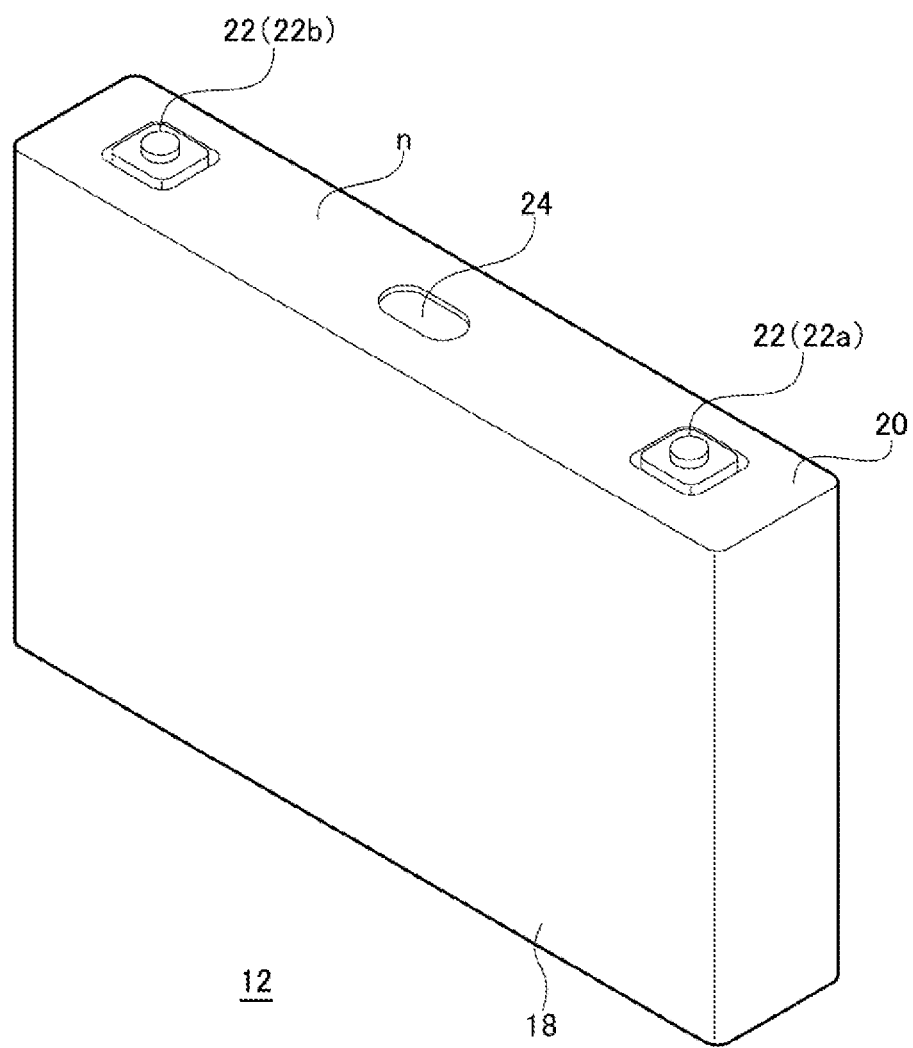
FIG. 3 is a schematic perspective view illustrating a structure of a battery.

Next, a detailed description will be given of structures of battery 12, separator 14, and covering 8 and a fixing structure in which covering 8 is fixed to battery assembly 2. FIG. 3 is a schematic perspective view illustrating a structure of battery 12. Battery 12 has exterior can 18 with a flat rectangular parallelepiped shape. A substantially rectangular opening is provided on one surface of exterior can 18, and exterior can 18 stores an electrode assembly, an electrolyte, and the like inserted through this opening. The opening of exterior can 18 is provided with sealing plate 20 to seal an inside of exterior can 18. Sealing plate 20 has positive electrode terminal 22a (positive-electrode output terminal 22) near one end in a longitudinal direction and negative electrode terminal 22b (negative-electrode output terminal 22) near another end in the longitudinal direction. Sealing plate 20 and output terminals 22 constitute a sealing body. Exterior can 18 and sealing plate 20 are each formed from a metal. Typically, exterior can 18 and sealing plate 20 are each formed from a metal such as aluminum or an aluminum alloy. Output terminal 22 is formed from a metal having electrical conductivity.

In the present exemplary embodiment, a side provided with the sealing body serves as top surface n of battery 12, and an opposite side serves as a bottom surface of battery 12. Further, battery 12 has two main surfaces connecting top surface n and the bottom surface. This main surface is a surface having a largest area among six surfaces of battery 12. Remaining two surfaces excluding top surface n, the bottom surface, and the two main surfaces serve as side surfaces of battery 12. A top surface side of batteries 12 serves as a top surface of battery assembly 2, and a bottom surface side of batteries 12 serves as a bottom surface of battery assembly 2.

Battery 12 has valve 24 on a surface to release gas produced inside battery 12. In the present exemplary embodiment, battery 12 has valve 24 on top surface n facing covering 8. In sealing plate 20, valve 24 is disposed between a pair of output terminals 22. Specifically, valve 24 is disposed substantially at a center of sealing plate 20 in the longitudinal direction. Valve 24 can be opened to release internal gas when internal pressure of exterior can 18 rises to a predetermined value or more. Valve 24 is also called a safety valve or a vent.

The plurality of batteries 12 is disposed such that the main surfaces of adjacent batteries 12 face each other and output terminals 22 face in an identical direction (for convenience herein, upward in a vertical direction). As described above, two adjacent batteries 12 are arrayed such that positive electrode terminal 22a of one of the batteries is adjacent to negative electrode terminal 22b of the other battery. Two adjacent batteries 12 may be arrayed such that positive electrode terminal 22a of one of the batteries is adjacent to positive electrode terminal 22a of the other battery. For example, if two adjacent batteries 12 are in parallel connection, batteries 12 are arrayed such that output terminals 22 of an identical polarity are adjacent to each other. Positive electrode terminal 22a and negative electrode terminal 22b are electrically connected via a bus bar.

Figure 4:
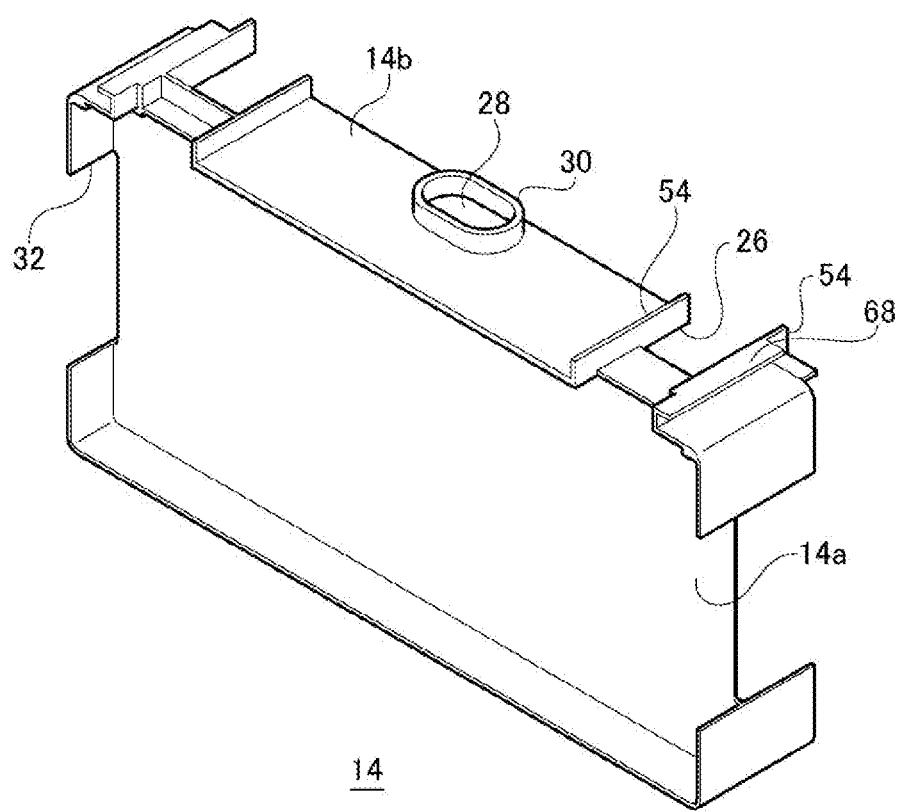
FIG. 4 is a schematic perspective view illustrating a structure of a separator.

FIG. 4 is a schematic perspective view illustrating a structure of separator 14. Separator 14 has plane 14a parallel to the main surface of battery 12 and wall 14b extending from a peripheral edge of plane 14a in stacking direction X of batteries 12. Since plane 14a extends between the main surfaces of adjacent batteries 12, exterior cans 18 of adjacent batteries 12 are insulated from each other. Further, since plane 14a extends between battery 12 and end plate 4, exterior can 18 of battery 12 and end plate 4 are insulated from each other.

Top surface n, the bottom surface, and the side surfaces of battery 12 are covered with wall 14b. This can suppress a short circuit between adjacent batteries 12 or between battery 12 and end plate 4, which can be caused by, for example, dew condensation on a surface of battery 12 or end plate 4. In other words, a creepage distance between adjacent batteries 12 or between battery 12 and end plate 4 can be secured by wall 14b. In particular, wall 14b covers top surface n of battery 12, whereby the above-described short circuit can be further suppressed. In the present exemplary embodiment, a tip of wall 14b of one of two adjacent separators 14 abuts on a tip of wall 14b of the other separator. Therefore, battery 12 is housed in a space formed by plane 14a and wall 14b. In the present exemplary embodiment, separator 14 holds battery 12 by way of wall 14b.

Wall 14b covering top surface n of battery 12 has cutout 26 at a position corresponding to output terminal 22 to expose output terminal 22 to the outside. Wall 14b covering top surface n of battery 12 has opening 28 at a position corresponding to valve 24 to expose valve 24 to the outside. A peripheral edge of opening 28 is provided with first barrier 30 projecting from a surface of wall 14b toward covering 8. Wall 14b covering the side surface of battery 12 has cutout 32 at a position corresponding to opening 6d of restraint member 6 to expose the side surface of battery 12. In assembled battery module 1, wall 14b is positioned between restraint member 6 and battery 12 (refer to FIG. 7). This configuration prevents restraint member 6 and battery 12 from coming into contact with each other.

Separator 14 has support 54 projecting toward covering 8 and supporting covering 8 in assembled battery module 1. Support 54 is disposed on wall 14b covering top surface n of battery 12. In the present exemplary embodiment, a pair of supports 54 is disposed at both ends of cutout 26. Supports 54, which face each other through cutout 26 and are arrayed in direction Y perpendicular to stacking direction X, put a bus bar into an installation position. The bus bar is disposed between the pair of supports 54. Support 54 adjacent to an outer side of battery assembly 2 has first bent part 68 extending along a surface of covering 8 adjacent to battery assembly 2 (back side 8*a* shown in FIG. 5) and abutting on the surface of the covering in assembled battery module 1. First bent part 68 is disposed at an end of support 54.

Some separators 14 have first insertion holes 56 (refer to FIG. 2) that are designed for insertion of fastener 52. In the present exemplary embodiment, two separators 14 in contact with respective end plates 4 have first insertion holes 56. Each separator 14 is provided with two first insertion holes 56. In each separator 14, two first insertion holes 56 are disposed apart from each other in direction Y perpendicular to stacking direction X. First insertion hole 56 includes through hole 76 (refer to FIG. 6) disposed in wall 14*b* and second barrier 70 (refer to FIG. 6) projecting from a peripheral edge of through hole 76 toward covering 8. An interior wall of first insertion hole 56 is provided with threads (not shown) compatible with threads in fastener 52.

Figure 5:
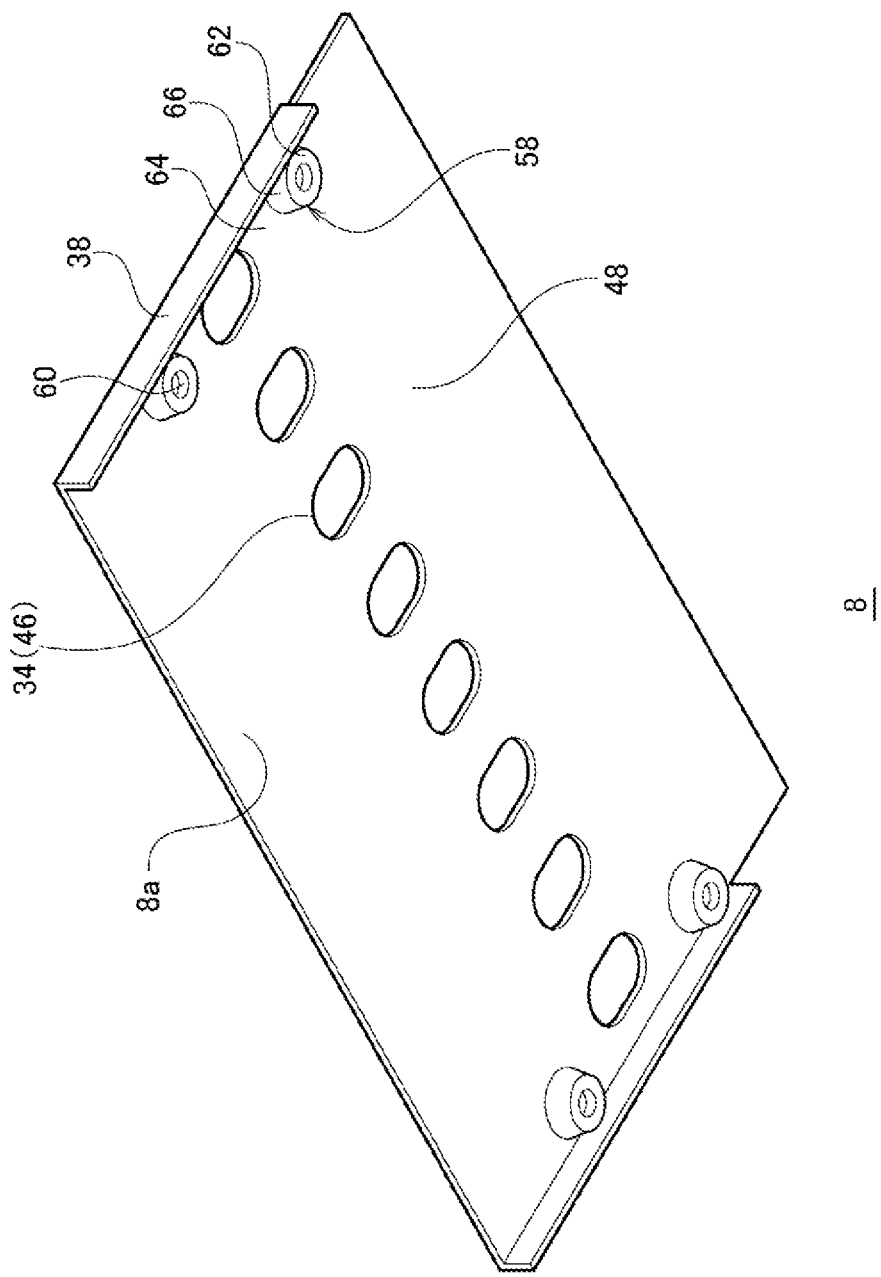
FIG. 5 is a schematic perspective view illustrating a structure of a covering.
Figure 6:
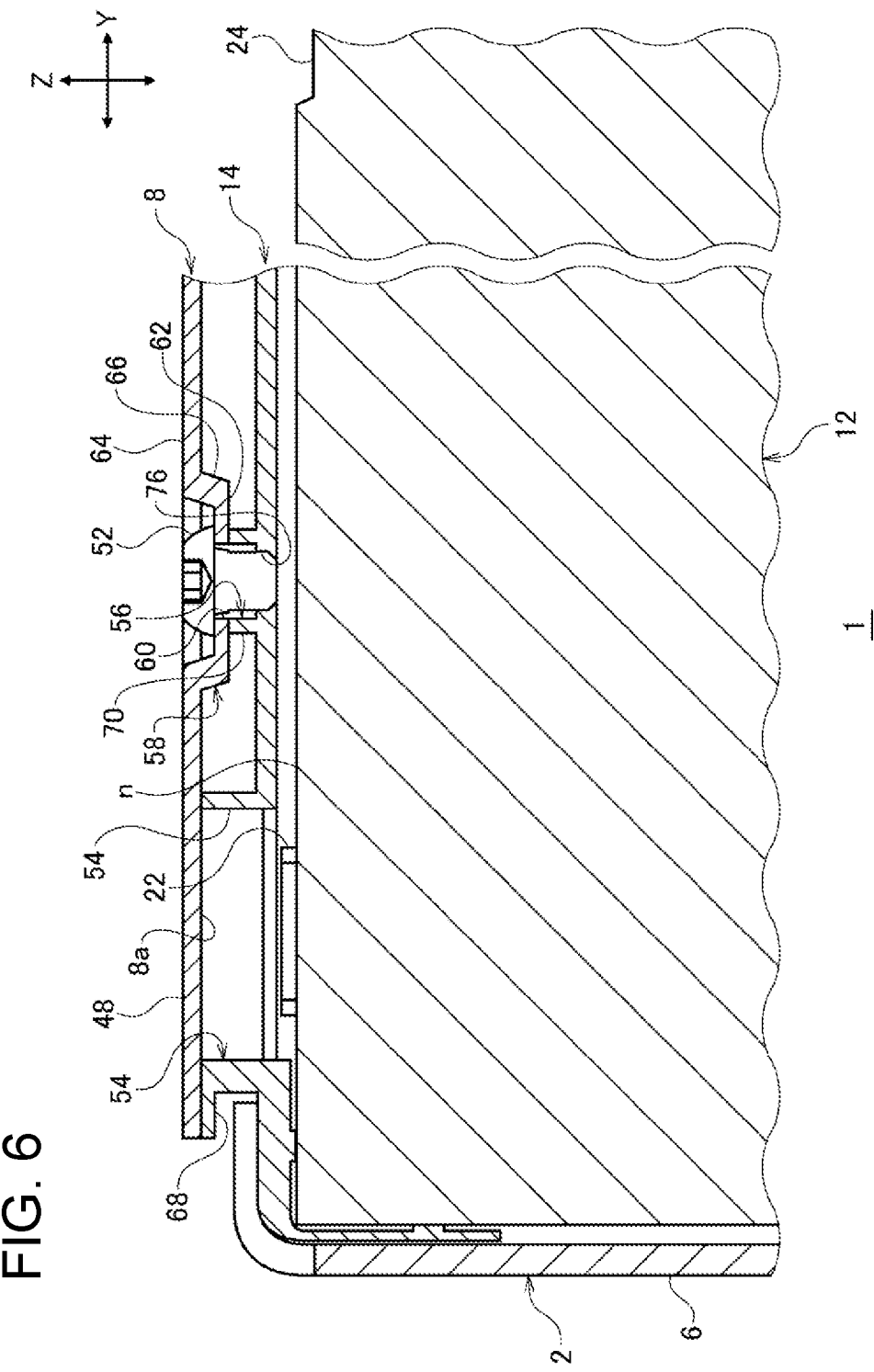
FIG. 6 is a schematic cross-sectional view illustrating a structure of a part of the battery module.

FIG. 5 is a schematic perspective view illustrating a structure of covering 8. FIG. 5 shows a main surface of covering 8 adjacent to batteries 12 (a back side specified herein for convenience). FIG. 6 is a schematic cross-sectional view illustrating a structure of a part of battery module 1. FIG. 6 shows a cross section traversing both first insertion hole 56 and second insertion hole 60 and extending in direction Y perpendicular to stacking direction X. In FIG. 6, illustration of an internal structure of battery 12 is omitted.

Covering 8 is a plate-shaped component that is configured so as to be commensurate in geometry with the top surface of battery assembly 2. This configuration prevents dust or other foreign matter from entering into a space formed between covering 8 and battery assembly 2. In the present exemplary embodiment, covering 8 is rectangular in shape. Covering 8 is made of a resin having an insulation property, for example. Examples of the resin forming covering 8 include thermoplastic resins such as polypropylene (PP) and polyethylene terephthalate (PBT).

Back side 8*a* of covering 8 has recesses 34 at positions corresponding to valves 24 of batteries 12. Recess 34 is depressed in shape in a direction of plate thickness. Thus, in covering 8, recesses 34 are thin in thickness in thickness direction Z of covering 8 (a direction shown with arrow Z in FIG. 7). In other words, recesses 34 constitute thin-walled parts 46 that are thinner in thickness than any other part of covering 8. A region contiguous to recesses 34 constitutes thick-walled part 48. Thick-walled part 48 is greater in thickness than thin-walled parts 46 in thickness direction Z. In covering 8, thin-walled part 46 has a thickness ranging, for example, from 0.5 mm to 1.0 mm, whereas thick-walled part 48, i.e. the remaining part, has a thickness ranging, for example, from 1.0 mm to 2.0 mm. Covering 8 also has a pair of legs 38 projecting toward battery assembly 2. The pair of legs 38 is disposed on two sides of the covering adjacent to the pair of end plates 4.

Covering 8 has step portions 58 and second insertion holes 60. Step portion 58 includes first segment 62 extending at a level relatively near to top surface n of battery 12 (a surface of battery assembly 2) and second segment 64 extending at a level relatively remote from top surface n. Second segment 64 is a part of a prime part of covering 8, that is, thick-walled part 48. First segment 62 and second segment 64 are joined by third segment 66 extending in a direction (approximately thickness direction Z of covering 8) intersecting with an extension direction of thick-walled part 48.

In the present exemplary embodiment, an entire perimeter of first segment 62 is surrounded with third segment 66 and second segment 64. In other words, step portion 58 is a part of covering 8 geometrically depressed toward battery assembly 2, i.e. a recess. As a result, first segment 62 is a bottom surface of the recess, and third segment 66 is a lateral surface of the recess.

Second insertion hole 60, a hole for insertion of fastener 52, is disposed in first segment 62. In assembled battery module 1, second insertion holes 60 are disposed so as to overlap first insertion holes 56 in lamination direction Z of battery assembly 2 and covering 8. First and second insertion holes 56 and 60 are disposed between output terminal 22 and valve 24 when viewed along stacking direction X of batteries 12, i.e. in direction Y.

Fastener 52 is inserted into second insertion hole 60 and further into first insertion hole 56 to be screwed into first insertion hole 56. This fixes battery assembly 2 and covering 8 to each other. With covering 8 fixed to battery assembly 2, supports 54 are in contact with back side 8*a* of covering 8. A surface of first bent part 68 extending parallel to back side 8*a* of covering 8 is in contact with back side 8*a*. First bent part 68 is in contact with an end of covering 8. With covering 8 fixed to battery assembly 2, a front end of second barrier 70 of separator 14 is in contact with first segment 62. Thus, supports 54, first bent parts 68, and second barriers 70 put covering 8 in a proper position in lamination direction Z.

Figure 7:
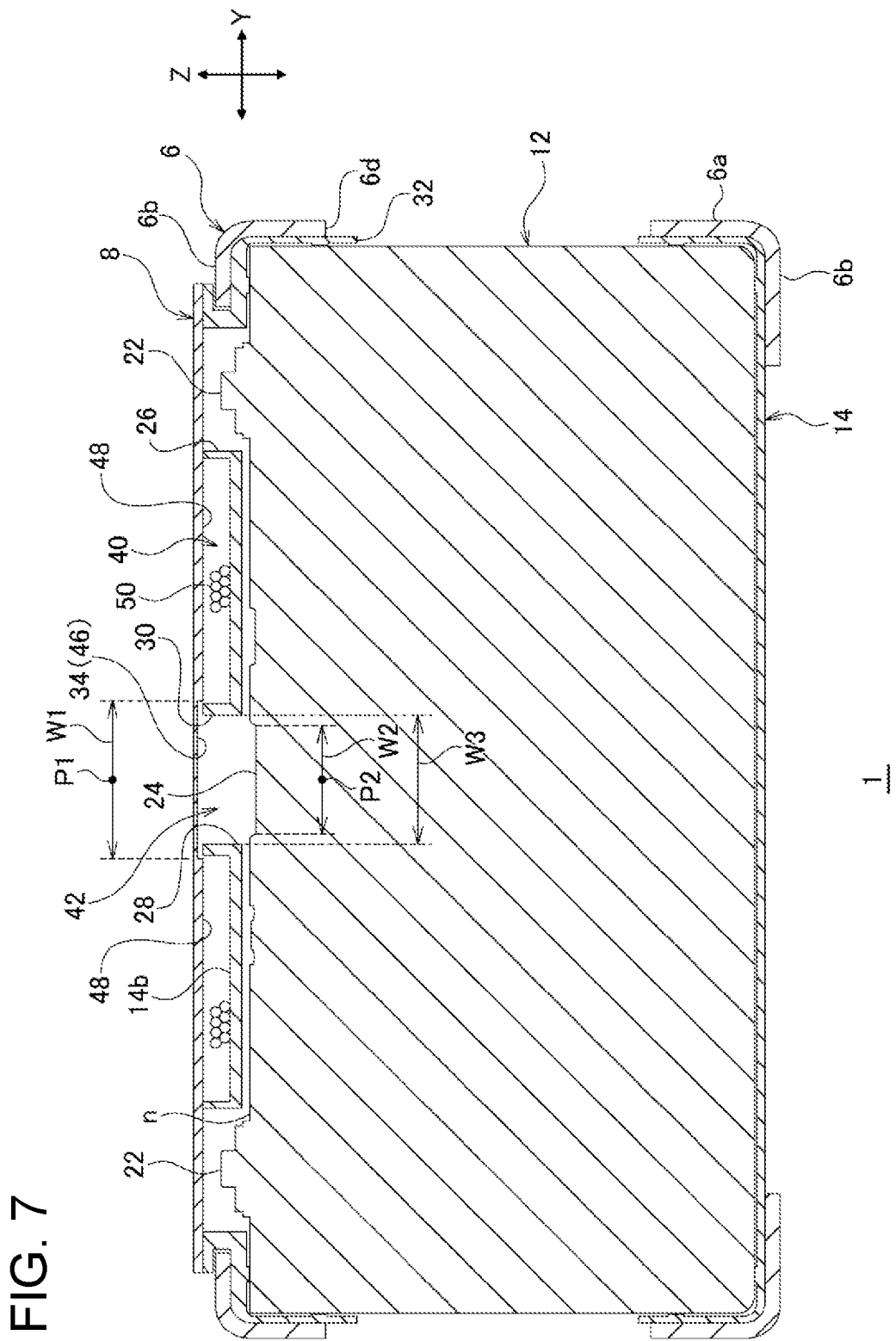
FIG. 7 is a schematic cross-sectional view illustrating the structure of the battery module.

Next, a structure of battery module 1 to release gas will be described in detail. FIG. 7 is a schematic cross-sectional view illustrating the structure of battery module 1. FIG. 7 shows a structure of a cross section traversing two output terminals 22 and valve 24 in any one battery 12. In FIG. 7, illustration of the internal structure of battery 12 is omitted.

As described above, battery 12 has valve 24 on top surface n to release gas produced inside the battery. Covering 8 covering top surface n of battery 12 includes recess 34 depressed in a direction of its thickness, i.e. in thickness direction Z of covering 8 (a direction shown with arrow Z in FIG. 7). Battery module 1 has storage space 40 between top surface n of battery 12 and covering 8. In storage space 40, parts such as wire 50 and a circuit board (not shown) connected to battery 12 are stored. For example, in storage space 40, a plurality of wires 50 connected to each battery 12 is stored for voltage measurement or other purposes. Thus, wires 50 are disposed between top surface n of battery 12, or a partition member described later, and thick-walled part 48. In general, the plurality of wires 50 is tied together and stored in storage space 40. Wires 50 are each covered with an insulating sheath and are insulated from each other.

Storage space 40 is disposed so as not to overlap valve 24 when viewed along thickness direction Z of covering 8. This allows storage space 40 to be disposed at a position that does not interfere with a flow path for gas released from valve 24. Meanwhile, recess 34 of covering 8 is disposed so as to at least partly overlap valve 24 when viewed along thickness direction Z. In other words, thin-walled part 46 is disposed face-to-face with valve 24.

Specifically, recess 34 and valve 24 are disposed such that extension range W1 of recess 34 at least partly overlaps extension range W2 of valve 24 when viewed along thickness direction Z. In other words, if recess 34 and valve 24 are projected on a plane perpendicular to thickness direction Z, projected images of the respective components at least partly overlap each other.

More preferably, recess 34 is disposed such that center P1 of recess 34 overlaps extension range W2 of valve 24 when viewed along thickness direction Z of covering 8. Further preferably, recess 34 is disposed such that center P1 of the recess overlaps center P2 of valve 24 when viewed along the same direction. Center P1 of recess 34 is, for example, a geometric barycenter of a flat form of recess 34 when viewed along thickness direction Z. Center P2 of valve 24 is similarly defined. Preferably, recess 34 is disposed such that entire valve 24 is within extension range W1 of recess 34 when viewed along thickness direction Z.

Battery module 1 has a partition member between top surface n of battery 12 and covering 8. The partition member is also called an insulating plate and is made of a resin having an insulation property, for example. In the present exemplary embodiment, wall 14b of separator 14 functions as a partition member. Wall 14b as the partition member together with covering 8 form storage space 40. Wall 14b as the partition member has opening 28 at a position corresponding to valve 24. Preferably, opening 28 is disposed such that entire valve 24 is within extension range W3 of opening 28 when viewed along lamination direction A. Preferably, opening 28 is disposed such that opening 28 is entirely within extension range W1 of recess 34 when viewed along thickness direction Z.

If pressure of gas produced inside battery 12 exceeds a predetermined level, the gas is released from valve 24. The gas released from valve 24 goes into space 42 between valve 24 and covering 8 through opening 28 of wall 14b. If pressure in space 42 exceeds a predetermined level due to continued release of gas from valve 24, recess 34, i.e. thin-walled part 46, in covering 8 ruptures, so that an opening is formed above valve 24. Gas accumulated in space 42 is released from the opening of covering 8 to an outside of battery module 1. This configuration allows gas released from valve 24 to be released from the opening of covering 8 disposed above valve 24 and thereby inhibits the gas from flowing into storage space 40.

Wall 14b as the partition member includes first barrier 30 projecting toward covering 8 and surrounding a periphery of valve 24. First barrier 30 surrounds the periphery of valve 24 when viewed along thickness direction Z. First barrier 30 surrounds opening 28. Thus, first barrier 30 is at least partly disposed between wires 50 and valve 24 in direction Y (a direction shown with arrow Y in FIG. 7) perpendicular to thickness direction Z. This configuration, owing to first barrier 30 disposed there, allows gas released from valve 24 to build up in space 42 and inhibits the gas from flowing into storage space 40 with improved reliability. Preferably, a front end of first barrier 30 extends into recess 34. Thin-walled parts 46 are thinner in thickness than first barriers 30.

As described above, battery module 1 according to the present exemplary embodiment includes covering 8 put over top surface n of each battery 12 and storage space 40 disposed between top surface n of battery 12 and covering 8 to store parts such as wires. Covering 8 includes recesses 34 depressed in thickness direction Z. Recess 34 is disposed so as to at least partly overlap valve 24 of battery 12 when viewed along thickness direction Z. In other words, covering 8 includes thin-walled parts 46 disposed face-to-face with respective valves 24 and thick-walled part 48 disposed in a region contiguous to thin-walled parts 46.

In this configuration, if gas produced in battery 12 is released from valve 24 of the battery, pressure in space 42 between valve 24 and recess 34 increases. Since covering 8 has small-thickness recess 34, i.e. thin-walled part 46, a portion where recess 34 is disposed, i.e. thin-walled part 46, preferentially ruptures in response to increased pressure in space 42. As a result, the gas in space 42 is released from a tear in covering 8 to the outside of battery module 1. This configuration inhibits gas released from valve 24 from flowing into storage space 40 that contains wire 50 and other parts. This reduces an amount of gas flowing into storage space 40.

Gas released from valve 24 is high in temperature. Thus, if gas flows into storage space 40, an insulating sheath for wire 50 may melt. A melted insulating sheath may develop a short circuit between batteries 12 via wire 50. Accordingly, it is desirable to inhibit gas from flowing into storage space 40. In view of protecting bus bars and output terminals 22, it is desirable to inhibit gas from shifting to storage space 40.

In response to this necessity, battery module 1 according to the present exemplary embodiment allows a portion of covering 8 that gas released from valve 24 heads for to preferentially rupture and thereby inhibits gas from flowing into storage spaces 40. This configuration can protect components disposed in an upper region of battery module 1, that is bus bars, output terminals 22, and wires 50 and other parts in storage spaces 40, against high-temperature gas. On the other hand, this configuration under normal conditions prevents condensed water, dust, and other foreign matter from coming into contact with sealing bodies owing to insulative covering 8 put over valves 24. This provides an improvement in safety of battery module 1.

Battery module 1 has wall 14b acting as a partition member. Wall 14b, which is disposed between top surface n of battery 12 and covering 8, defines storage space 40 together with covering 8. This configuration, owing to wall 14b disposed there, can insulate wires 50 and other parts stored in storage space 40 from battery 12 with improved reliability. A part of separator 14 functions as the partition member. This prevents an increase in a number of components and an increase in size of battery module 1.

Wall 14b includes first barrier 30 projecting toward covering 8 and surrounding the periphery of valve 24 or opening 28 disposed at a position corresponding to valve 24. Thus, first barrier 30 is at least partly disposed between wires 50 and valve 24 in direction Y perpendicular to thickness direction Z. This configuration, owing to first barrier 30 disposed there, allows gas released from valve 24 to build up in space 42 and inhibits the gas from flowing into storage space 40 with improved reliability. This provides a further improvement in safety of battery module 1. The front end of first barrier 30 extends into recess 34. This prevents battery module 1 from increasing in size due to first barrier 30 disposed there. Thin-walled parts 46 are thinner in thickness than first barriers 30. This configuration enables thin-walled part 46 to rupture with improved reliability.

Battery module 1 according to the present exemplary embodiment includes battery assembly 2, covering 8, and fastener 52 for fixing covering 8 to battery assembly 2. Battery assembly 2 has first insertion holes 56 in some separators 14. Covering 8 has step portions 58 that each include first segment 62 and second segment 64. First segment 62 is nearer to the surface of battery assembly 2 than second segment 64, and second segment 64 is remoter from the surface of battery assembly 2 than first segment 62. Covering 8 has second insertion hole 60, which is disposed in each first segment 62. Fastener 52 is inserted into second insertion holes 60 and into first insertion holes 56 so as to fix battery assembly 2 and covering 8 to each other.

In the present exemplary embodiment, battery assembly 2 and covering 8 are fixed together by fastener 52 as described above. This configuration prevents fastening of covering 8 to battery assembly 2 from getting unsatisfactory even if battery assembly 2 has swelled due to a swelling of any battery 12. This prevents a decrease in reliability of battery module 1.

A swelling of battery assembly 2 displaces positions at which battery assembly 2 and covering 8 are fixed together, i.e. positions of first and second insertion holes 56 and 60, in an expansion direction of battery assembly 2. Battery assembly 2 swells primarily in stacking direction X of batteries 12. In contrast to that, covering 8 has second insertion hole 60 in each first segment 62, a lower tier of step portion 58, and thus can follow the displacement of the positions by a change in slope of third segment 66. In other words, covering 8 can accommodate a change in a dimension of battery assembly 2 by step portions 58. This configuration lessens stress put on covering 8 due to a swelling of battery assembly 2 and thereby prevents breakage of covering 8. This prevents a decrease in reliability of battery module 1.

Second insertion hole 60 is disposed in each first segment 62, a lower tier of step portion 58. As a result, a part of fastener 52 projecting above second segment 64 can be decreased in height or be eliminated. This configuration contributes to a reduction in size (profile or height) of battery module 1. First and second insertion holes 56 and 60 are disposed between output terminal 22 and valve 24 when viewed along stacking direction X of batteries 12. Consequently, a level difference between first and second segments 62 and 64 can be readily secured. This configuration allows a storage space for fastener 52 to be made without an increase in distance between covering 8 and battery assembly 2. This contributes to a reduction in size of battery module 1 with improved reliability.

Step portion 58 accommodates a part of fastener 52 that otherwise projects above second segment 64 and hence battery module 1 can come down in profile. This configuration eliminates the need for disposing battery assembly 2 and covering 8 closer to each other for profile reduction. As a result, distance between battery assembly 2 and covering 8 can be maintained. This in turn provides space 42 above valve 24, i.e. a gas duct capacity.

Battery assembly 2 includes supports 54 incorporated in separators 14. Support 54 has first bent part 68 extending along back side 8a of covering 8 and abutting on back side 8a. This configuration provides an increased area of contact between covering 8 and battery assembly 2. This inhibits entry of dust or other foreign matter into the space between battery assembly 2 and covering 8 with improved reliability.

Second Exemplary Embodiment

A battery module according to a second exemplary embodiment is summarized as below. In the battery module according to the second exemplary embodiment, a covering has second barriers each projecting toward a surface of a battery and surrounding a thin-walled part. The second barrier is at least partly disposed between wires and the thin-walled part.

In the battery module according to the second exemplary embodiment, the thin-walled parts are thinner in thickness than the second barriers.

In the battery module according to the second exemplary embodiment, a first barrier and the corresponding second barrier overlap each other when viewed along a direction perpendicular to a thickness direction of the covering.

Figure 8:
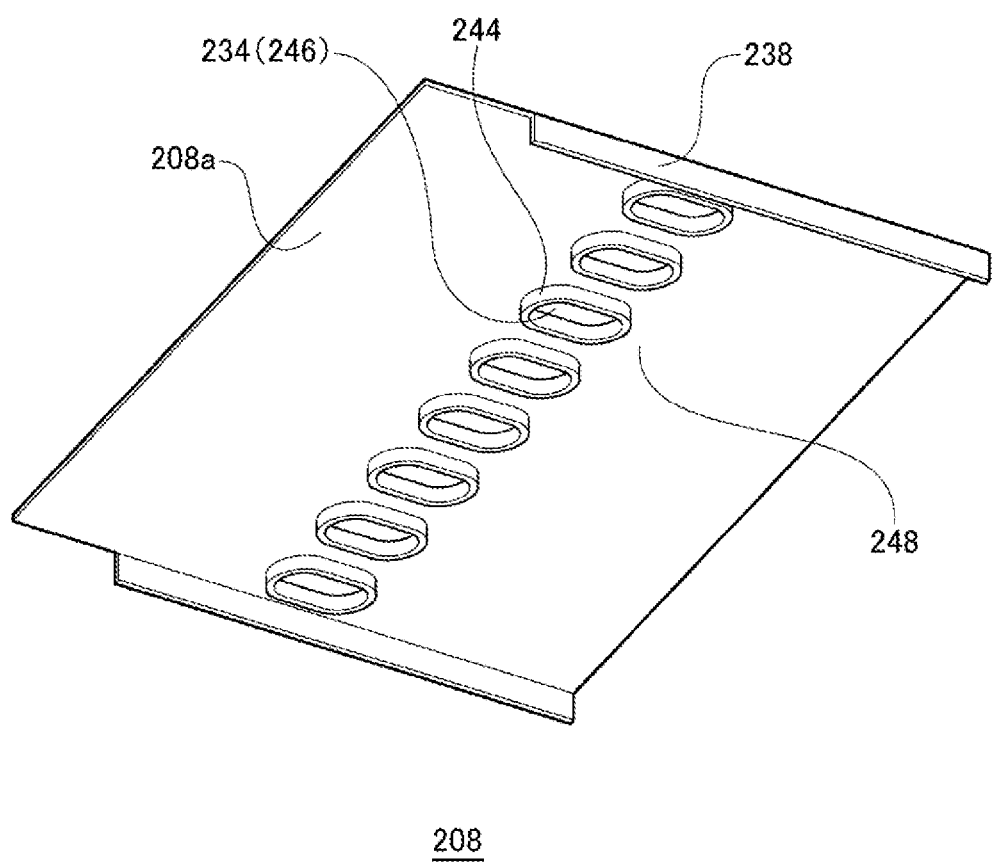
FIG. 8 is a schematic perspective view illustrating a structure of a covering that is a component of a battery module according to a second exemplary embodiment.

The battery module according to the second exemplary embodiment shares a configuration with the battery module of the first exemplary embodiment except for a dissimilarity in covering shape. The following description of the battery module according to the present exemplary embodiment is primarily given on differences between the first and second exemplary embodiments, and redundant descriptions of shared elements are omitted or simplified. FIG. 8 is a schematic perspective view illustrating a structure of the covering that is a component of the battery module according to the second exemplary embodiment. FIG. 8 shows a back side of the covering.

Covering 208 incorporated in battery module 200 according to the present exemplary embodiment shares a configuration with covering 8 of the first exemplary embodiment except that covering 208 includes second barriers 244. In other words, covering 208 is a plate-shaped component that has a surface corresponding in geometry with a top surface of battery assembly 2. Back side 208a of covering 208 has recesses 234 at positions corresponding to valves 24 of batteries 12. Recesses 234 constitute thin-walled parts 246. A region contiguous to recesses 234 constitutes thick-walled part 248. Covering 208 is similar in dimensions to covering 8.

Covering 208 has a pair of legs 238 projecting toward battery assembly 2. Covering 208 is configured so as to be commensurate in geometry with the top surface of battery assembly 2. This configuration prevents dust or other foreign matter from entering into a space formed between covering 208 and the top surface of battery assembly 2.

Covering 208 may be structurally designed so as to be fixed to battery assembly 2 by clamping an upper part of separators 14 between the pair of legs 238. Covering 208 further includes second barriers 244 each projecting toward top surface n of battery 12 and surrounding a periphery of valve 24. Second barrier 244 surrounds the periphery of valve 24 when viewed along thickness direction Z (a direction shown with arrow Z in FIG. 9). Second barrier 244 surrounds thin-walled part 246.

Figure 9:
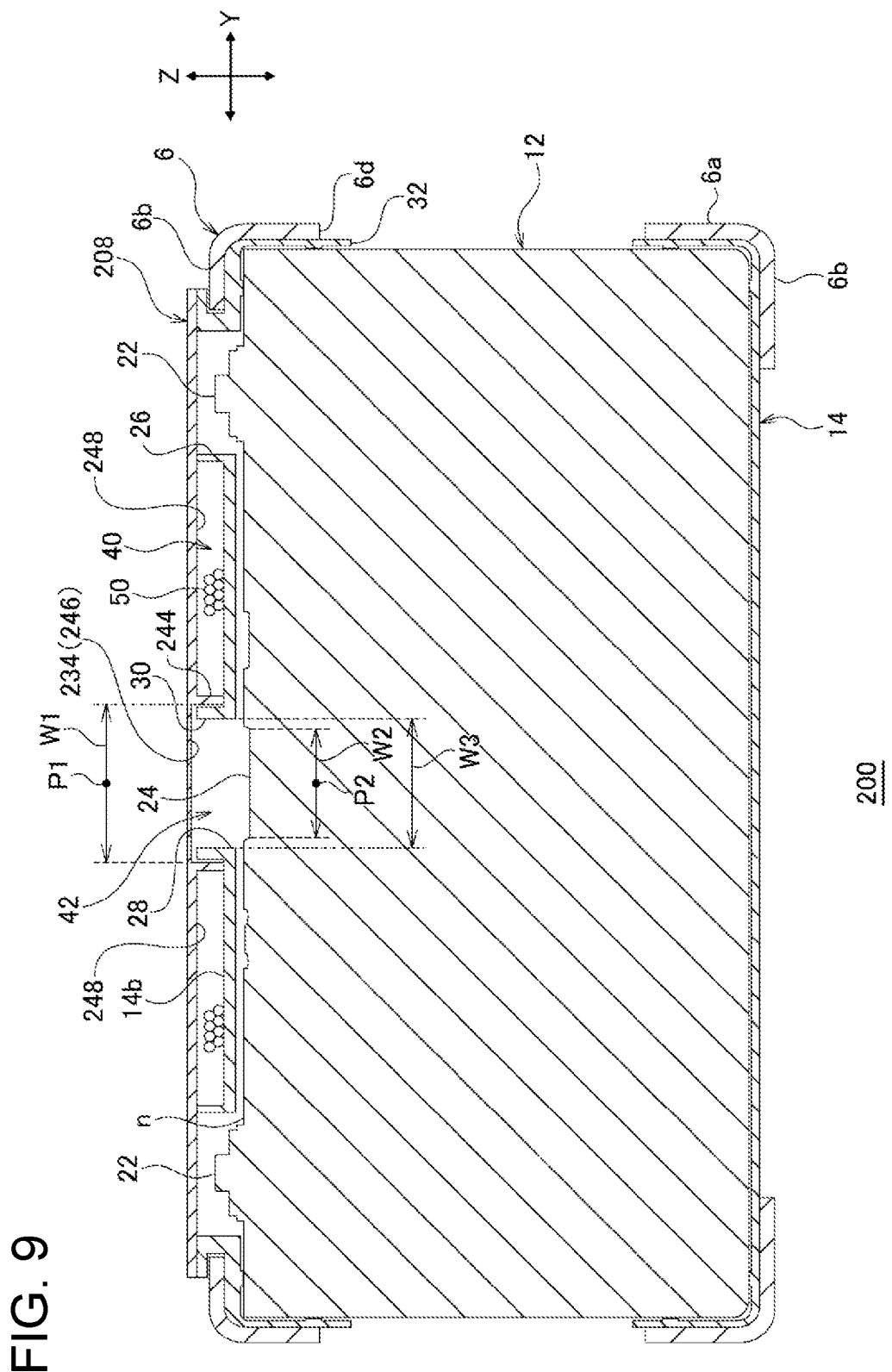
FIG. 9 is a schematic cross-sectional view illustrating a structure of the battery module according to the second exemplary embodiment.

Next, a structure of battery module 200 to release gas will be described in detail. FIG. 9 is a schematic cross-sectional view illustrating the structure of battery module 200 according to the second exemplary embodiment. FIG. 9 shows a structure of a cross section traversing two output terminals 22 and valve 24 in any one battery 12. In FIG. 9, illustration of an internal structure of battery 12 is omitted.

Battery 12 has valve 24 on top surface n. Covering 208 includes recess 234 depressed in thickness direction Z. Battery module 200 has storage space 40 between top surface n of battery 12 and covering 208. Storage space 40 is disposed so as not to overlap valve 24 when viewed along thickness direction Z. In storage space 40, parts such as wire 50 are stored. Thus, wires 50 are disposed between top surface n of battery 12, or a partition member, and thick-walled part 248. Meanwhile, recess 234 of covering 208 is disposed so as to at least partly overlap valve 24 when viewed along thickness direction Z. In other words, recess 234 and valve 24 are disposed such that extension range W1 of recess 234 at least partly overlaps extension range W2 of valve 24 when viewed along thickness direction Z.

More preferably, recess 234 is disposed such that center P1 of recess 234 overlaps extension range W2 of valve 24 when viewed along thickness direction Z. Further preferably, recess 234 is disposed such that center P1 of the recess overlaps center P2 of valve 24 when viewed along the same direction. Preferably, recess 234 is disposed such that entire valve 24 is within extension range W1 of recess 234 when viewed along thickness direction Z.

Battery module 200 has wall 14b as a partition member between top surface n of battery 12 and covering 208. Wall 14b together with covering 8 form storage space 40. Wall 14b has opening 28 at a position corresponding to valve 24. Preferably, opening 28 is disposed such that entire valve 24 is within extension range W3 of opening 28 when viewed along thickness direction Z. Preferably, opening 28 is disposed such that opening 28 is entirely within extension range W1 of recess 234 when viewed along thickness direction Z. In response to release of gas from valve 24, recess 234, i.e. thin-walled part 246, in covering 208 ruptures, so that an opening is formed above valve 24. Gas is released from the opening of covering 208 to an outside of battery module 200.

A peripheral edge of opening 28 is provided with first barrier 30 projecting toward covering 8. First barrier 30 is at least partly disposed between wires 50 and valve 24 in direction Y (a direction shown with arrow Y in FIG. 9) perpendicular to thickness direction Z. First barrier 30 inhibits gas released from valve 24 from flowing into storage space 40. A peripheral edge of thin-walled part 246 is provided with second barrier 244 projecting toward top surface n of battery 12. Second barrier 244 is at least partly disposed between wires 50 and thin-walled part 246 in direction Y perpendicular to thickness direction Z. Second barrier 244 as well inhibits gas released from valve 24 from flowing into storage space 40. Thin-walled parts 246 are thinner in thickness than first barriers 30 and second barriers 244.

First and second barriers 30 and 244 overlap each other when viewed along direction Y perpendicular to thickness direction Z. In the present exemplary embodiment, second barrier 244 is disposed outside first barrier 30, a front end of first barrier 30 extends into recess 234, and a front end of second barrier 244 is in contact with a surface of wall 14b. This configuration forms a labyrinthine structure of overlapping first and second barriers 30 and 244 and thus inhibits gas from flowing into storage space 40 with improved reliability.

As with the first exemplary embodiment, battery module 200 according to the present exemplary embodiment provides improved safety. Further, the other effects can be similarly exhibited.

In the present exemplary embodiment, covering 208 includes second barriers 244. This configuration inhibits gas released from valve 24 from flowing into storage space 40 with improved reliability. This provides a further improvement in safety of battery module 200. Thin-walled parts 246 are thinner in thickness than second barriers 244. This configuration enables thin-walled part 246 to rupture with improved reliability. First and second barriers 30 and 244 overlap each other in direction B perpendicular to lamination direction A, i.e. when viewed along a direction in which valve 24 and storage space 40 are disposed. This configuration inhibits gas released from valve 24 from flowing into storage space 40 with greater reliability. This provides a greater improvement in safety of battery module 200.

Third Exemplary Embodiment

Figure 10:
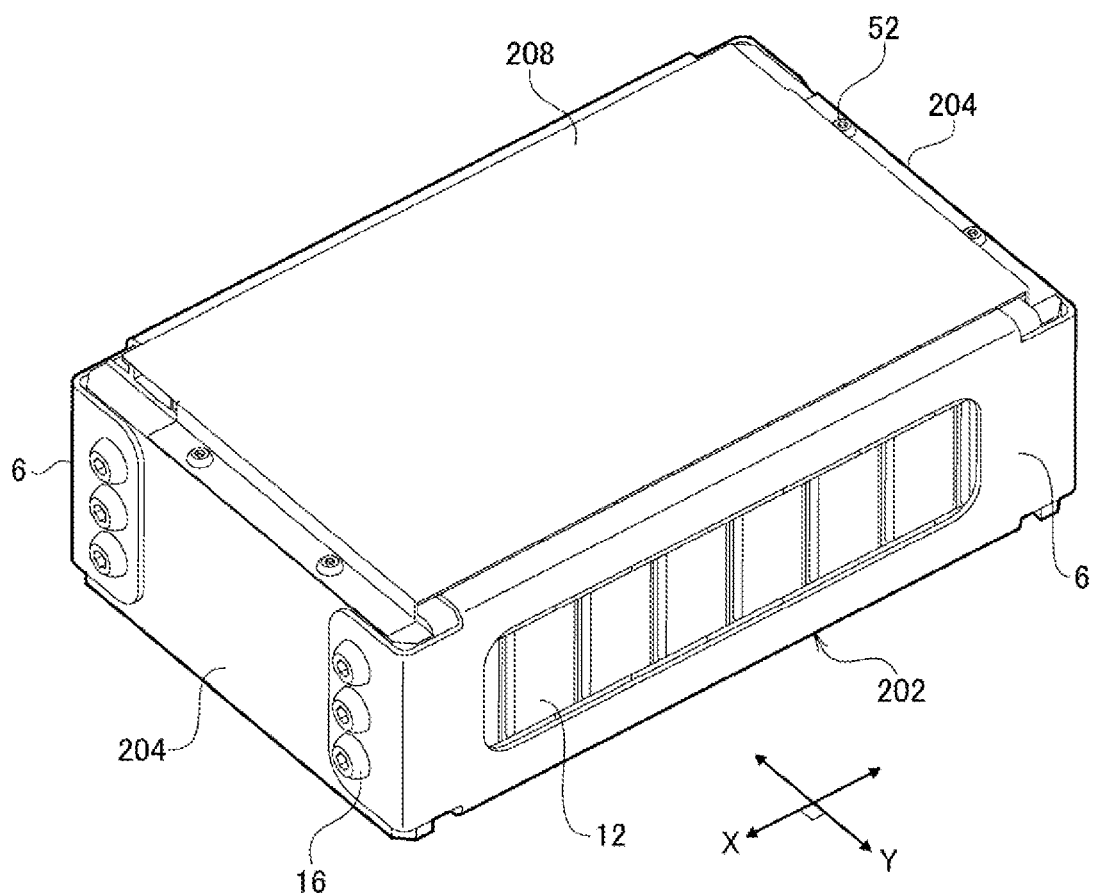
FIG. 10 is a schematic perspective view illustrating a structure of a battery module according to a third exemplary embodiment.
Figure 11:
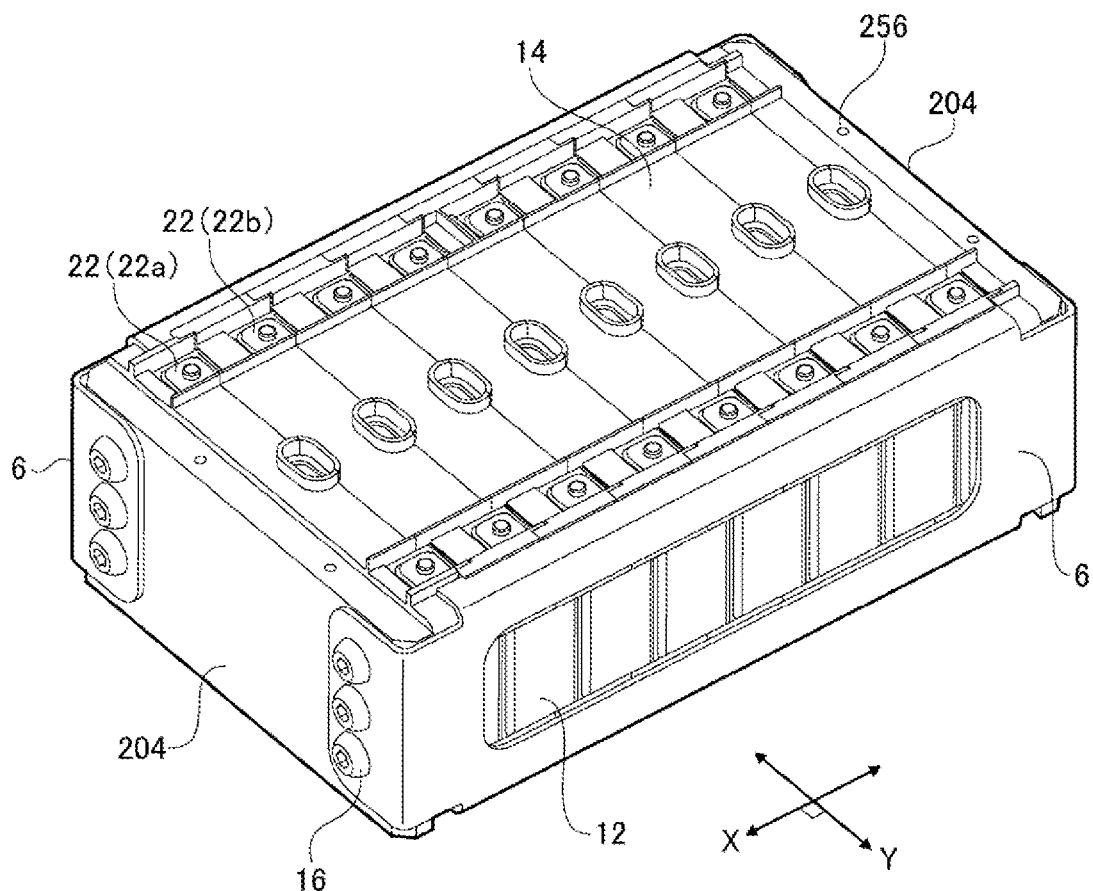
FIG. 11 is a schematic perspective view illustrating a structure of a battery assembly.
Figure 12:
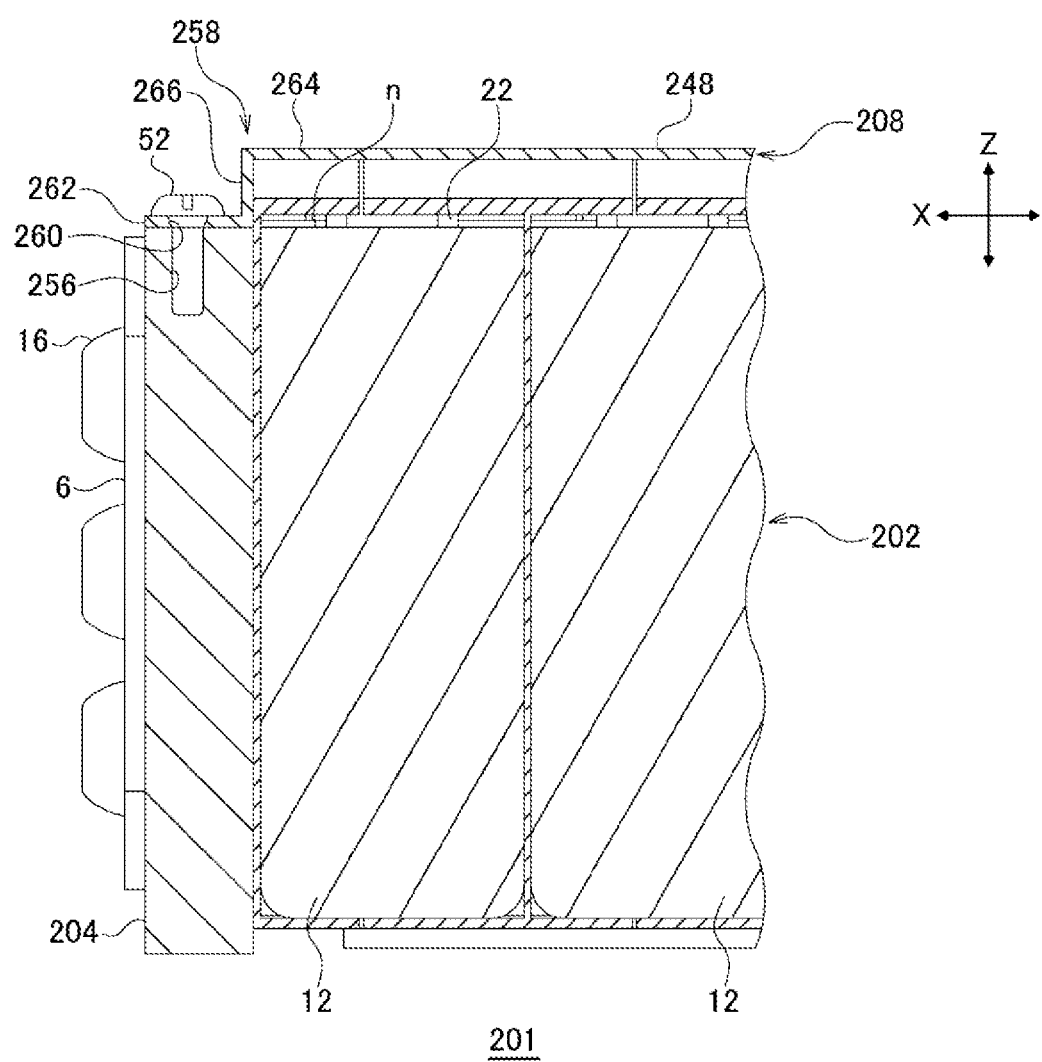
FIG. 12 is a schematic cross-sectional view illustrating a structure of a part of the battery module.

A battery module according to a third exemplary embodiment shares a configuration with the battery module of the first exemplary embodiment except for dissimilarities in position of first insertion holes and shape of step portions. The following description of the battery module according to the present exemplary embodiment is primarily given on differences between the first and third exemplary embodiments, and redundant descriptions of shared elements are omitted or simplified. FIG. 10 is a schematic perspective view illustrating a structure of the battery module according to the third exemplary embodiment. FIG. 11 is a schematic perspective view illustrating a structure of a battery assembly. FIG. 12 is a schematic cross-sectional view illustrating a structure of a part of the battery module. FIG. 12 shows a cross section traversing both a first insertion hole and a second insertion hole and extending in stacking direction X of batteries 12. In FIG. 12, illustration of an internal structure of battery 12 is omitted.

In battery assembly 202 of battery module 201 according to the present exemplary embodiment, end plates 204 have first insertion holes 256 that are designed for insertion of fastener 52. In the present exemplary embodiment, each end plate 204 is provided with two first insertion holes 256. In each end plate 204, two first insertion holes 256 are disposed apart from each other in direction Y perpendicular to stacking direction X. First insertion hole 256 includes a hole disposed in end plate 204. An interior wall of first insertion hole 256 is provided with threads (not shown) compatible with threads in fastener 52.

Covering 208 has step portions 258 and second insertion holes 260. Step portion 258 includes first segment 262 extending at a level relatively near to top surface n of battery 12 (a surface of battery assembly 2) and second segment 264 extending at a level relatively remote from top surface n. Second segment 264 is a part of a prime part of covering 208, that is, thick-walled part 248. First segment 262 and second segment 264 are joined by third segment 266 extending in a direction (approximately thickness direction Z of covering 208) intersecting with an extension direction of thick-walled part 248.

First segment 262 is disposed at an end part of covering 208 and is in contact with a top surface of end plate 204. Third segment 266 is joined to an edge of first segment 262 adjacent to a middle of battery assembly 202. An edge of first segment 262 adjacent to an outer side of battery assembly 202 is exposed to the outside. Thus, step portion 258 according to the present exemplary embodiment is shaped like a stair or a crank.

Second insertion hole 260, a hole for insertion of fastener 52, is disposed in first segment 262. In assembled battery module 201, second insertion holes 260 are disposed so as to overlap first insertion holes 256 in thickness direction Z of covering 208. Fastener 52 is inserted into second insertion hole 260 and further into first insertion hole 256 to be screwed into first insertion hole 256. This fixes battery assembly 202 and covering 8 to each other.

Battery module 201 according to the present exemplary embodiment as well prevents fastening of covering 8 to battery assembly 202 from getting unsatisfactory due to a swelling of battery assembly 202. This prevents a decrease in reliability of battery module 201. A swelling of battery assembly 202 displaces positions at which battery assembly 202 and covering 208 are fixed together. Covering 208 can follow the displacement of the positions by a change in slope of third segment 266. This configuration lessens stress put on covering 208 due to a swelling of battery assembly 202 and thereby prevents breakage of covering 208.

Second insertion holes 260 are disposed in each first segment 262, a lower tier of step portion 258. This configuration contributes to a reduction in size (profile or height) of battery module 201. This configuration also provides a gas duct capacity. Furthermore, first segments 262 are in contact with the top surfaces of end plates 204. This provides an increased area of contact between covering 208 and battery assembly 202. This in turn inhibits entry of dust or other foreign matter into the space between battery assembly 202 and covering 208 with improved reliability.

Fourth Exemplary Embodiment

Figure 13:
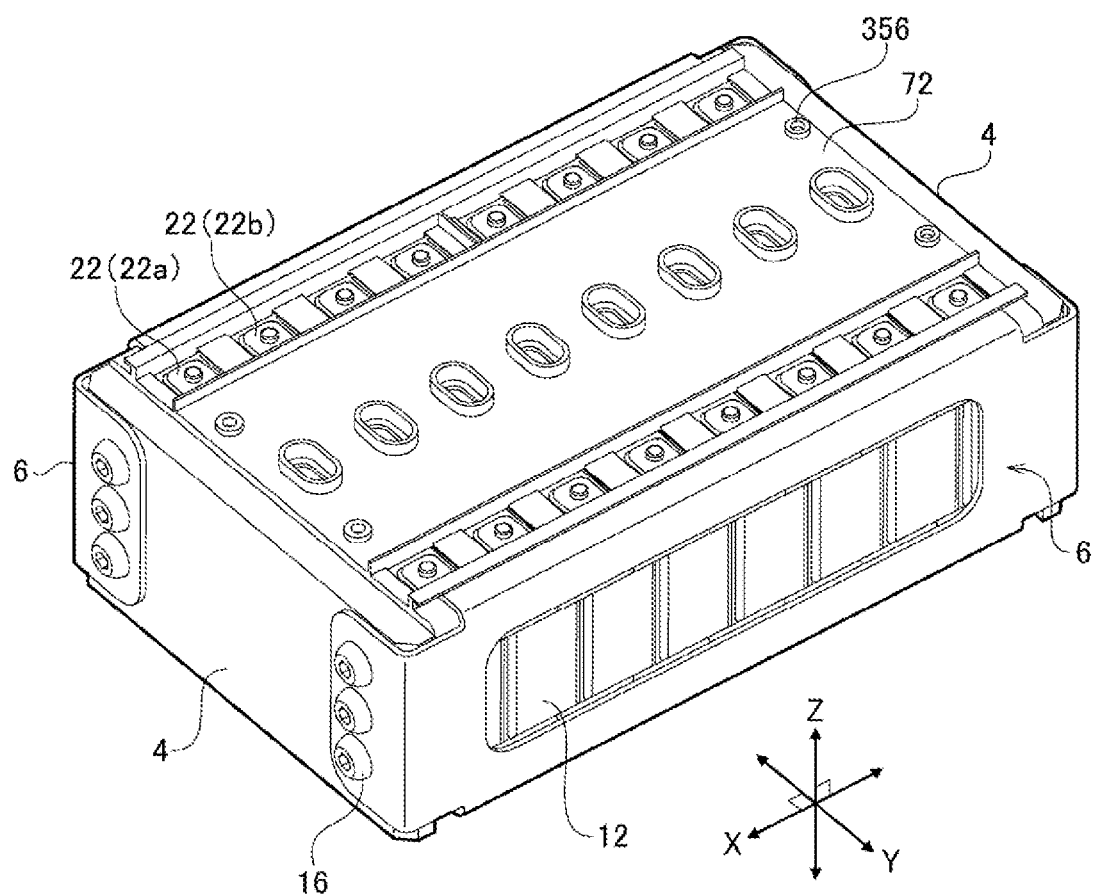
FIG. 13 is a schematic perspective view illustrating a structure of a battery assembly incorporated in a battery module according to a fourth exemplary embodiment.
Figure 14:
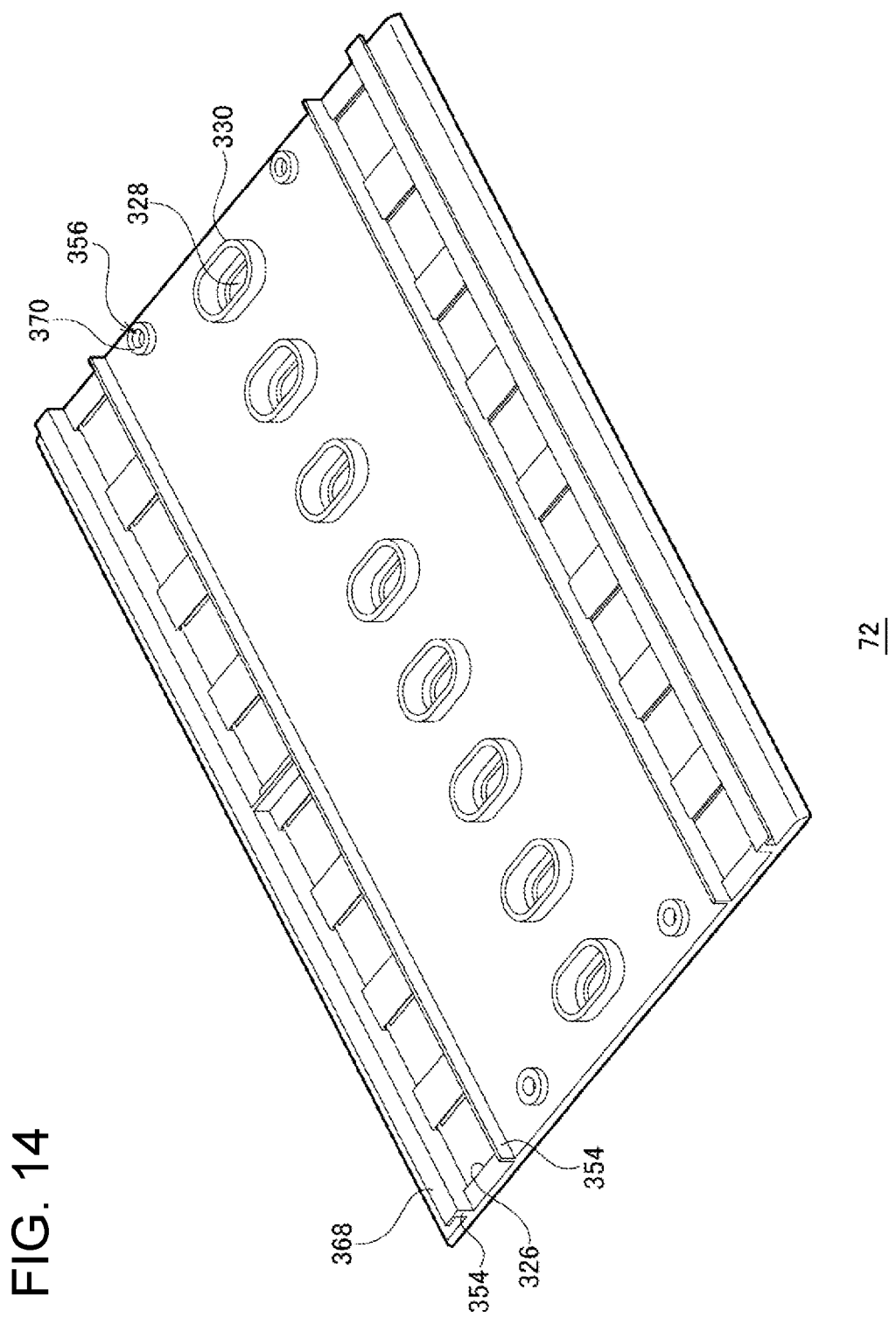
FIG. 14 is a schematic perspective view illustrating a structure of a bus bar plate.

A battery module according to a fourth exemplary embodiment shares a configuration with the battery module of the first exemplary embodiment except for a bus bar plate incorporated in the battery module of the fourth exemplary embodiment. The following description of the battery module according to the present exemplary embodiment is primarily given on differences between the first and fourth exemplary embodiments, and redundant descriptions of shared elements are omitted or simplified. FIG. 13 is a schematic perspective view illustrating a structure of a battery assembly incorporated in the battery module according to the fourth exemplary embodiment. FIG. 14 is a schematic perspective view illustrating a structure of the bus bar plate.

Battery assembly 302 incorporated in the battery module according to the present exemplary embodiment includes bus bar plate 72 to cover top surfaces n of a plurality of stacked batteries 12. Bus bar plate 72 is a plate-shaped component on which a plurality of bus bars is put, and is made of a resin having an insulation property, for example. Bus bar plate 72 is structurally equivalent to integrated walls 14b of separators 14 covering top surfaces n of batteries 12 in the first exemplary embodiment.

Bus bar plate 72 has opening 326 at a position corresponding to each output terminal 22 to expose output terminal 22 to the outside. The bus bar plate also has opening 328 at a position corresponding to valve 24 of each battery 12 to expose valve 24 to the outside. A peripheral edge of opening 328 is provided with first barrier 330 projecting toward covering 8. Bus bar plate 72 has supports 354 projecting toward covering 8 and supporting covering 8 in the assembled battery module.

In the present exemplary embodiment, a pair of supports 354 are disposed at both ends of openings 326 in direction Y perpendicular to stacking direction X. Supports 354, which face each other through openings 326, put a bus bar into an installation position. The bus bar is disposed between the pair of supports 354. Support 354 adjacent to an outer side of battery assembly 302 has first bent part 368 extending along a surface of covering 8 adjacent to battery assembly 302 (back side 8a shown in FIG. 5) and abutting on the surface of the covering in the assembled battery module. First bent part 368 is disposed at an end of support 54.

Bus bar plate 72 has first insertion holes 356 that are designed for insertion of fastener 52. In the present exemplary embodiment, first insertion holes 356 are disposed at both ends of the bus bar plate in stacking direction X. Each end of the bus bar plate is provided with two first insertion holes 356. At each end of the bus bar plate, two first insertion holes 356 are disposed apart from each other in direction Y perpendicular to stacking direction X. First insertion hole 356 includes a hole (not shown) disposed in a main surface of bus bar plate 72 and protrusion 370 projecting from a peripheral edge of the hole toward covering 8. An interior wall of first insertion hole 356 is provided with threads (not shown) compatible with threads in fastener 52. First insertion hole 356 is disposed between output terminal 22 and valve 24 when viewed along stacking direction X of batteries 12.

The battery module according to the present exemplary embodiment includes covering 8 (refer to FIG. 5) identical to the covering of the first exemplary embodiment. Covering 8 is piled on bus bar plate 72. In this state, first insertion hole 356 and second insertion hole 60 overlap each other in lamination direction Z of battery assembly 302 and covering 8. Fastener 52 is inserted into second insertion hole 60 and further into first insertion hole 356 to be screwed into first insertion hole 356. This fixes battery assembly 302 and covering 8 to each other.

The battery module according to the present exemplary embodiment can produce effects similar to those in the first exemplary embodiment. Bus bar plate 72 incorporated in the battery module maintains a creepage distance between adjacent batteries 12, as well as between battery 12 and end plate 4 with improved reliability.

Fifth Exemplary Embodiment

Figure 15:
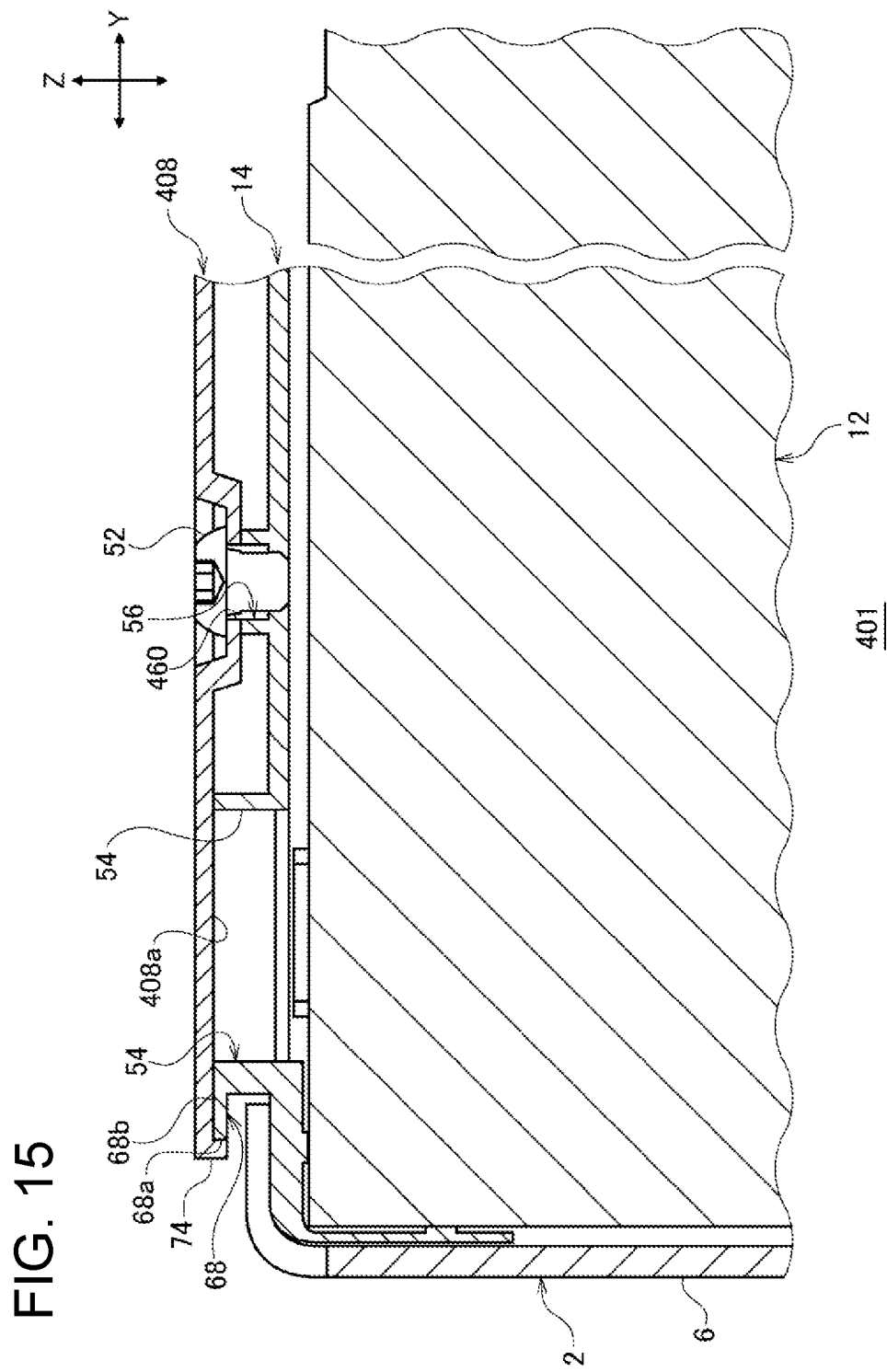
FIG. 15 is a schematic cross-sectional view illustrating a structure of a part of a battery module according to a fifth exemplary embodiment.

A battery module according to a fifth exemplary embodiment shares a configuration with the battery module of the first exemplary embodiment except for a dissimilarity in covering shape. The following description of the battery module according to the present exemplary embodiment is primarily given on differences between the first and fifth exemplary embodiments, and redundant descriptions of shared elements are omitted or simplified. FIG. 15 is a schematic cross-sectional view illustrating a structure of a part of the battery module according to the fifth exemplary embodiment. FIG. 15 shows a cross section traversing both first insertion hole 56 and second insertion hole 460 and extending in direction Y perpendicular to stacking direction X. In FIG. 15, illustration of an internal structure of battery 12 is omitted.

Battery module 401 according to the present exemplary embodiment includes battery assembly 2 identical to that in battery module 1 according to the first exemplary embodiment. Covering 408 incorporated in battery module 401 has second bent part 74 extending along end surface 68a of first bent part 68 of support 54 and abutting on end surface 68a. Second bent part 74 is an end part of covering 408 that is bent toward battery assembly 2. The other part of covering 408 is structurally identical to covering 8 in the first exemplary embodiment.

Specifically, first bent part 68 extends along back side 408a of covering 408 adjacent to battery assembly 2, with surface 68b parallel to back side 8a abutting on back side 8a. End surface 68a of first bent part 68 extends from an edge of surface 68b adjacent to an outer side of battery assembly 2 in lamination direction Z. Second bent part 74 extends along end surface 68a and abuts on end surface 68a. This configuration provides an increased area of contact between covering 408 and battery assembly 2. This inhibits entry of dust or other foreign matter into the space between battery assembly 2 and covering 408 with improved reliability. Battery module 401 according to the present exemplary embodiment can produce other effects as with the first exemplary embodiment.

The present invention is not limited to the above-described exemplary embodiments. The exemplary embodiments can be combined, or further modification, such as various design changes, can be added thereto based on knowledge of the person of ordinary skill in the art. The combined or further modified exemplary embodiments are also included in the scope of the present invention. A new exemplary embodiment made by combining the above-described exemplary embodiments or adding modification thereto has effects of the combined or modified exemplary embodiments.

In the first exemplary embodiment described above, first barriers 30 are provided. In the second exemplary embodiment, first and second barriers 30 and 244 are provided. However, an exemplary embodiment in which only second barriers 244 are provided can inhibit gas from flowing into storage space 40. Even an exemplary embodiment in which none of first and second barriers 30 and 244 is provided can inhibit gas from flowing into storage space 40 by allowing recess 34, 234 to rupture as compared with cases in which recess 34, 234 is not configured to rupture.

Figure 16:
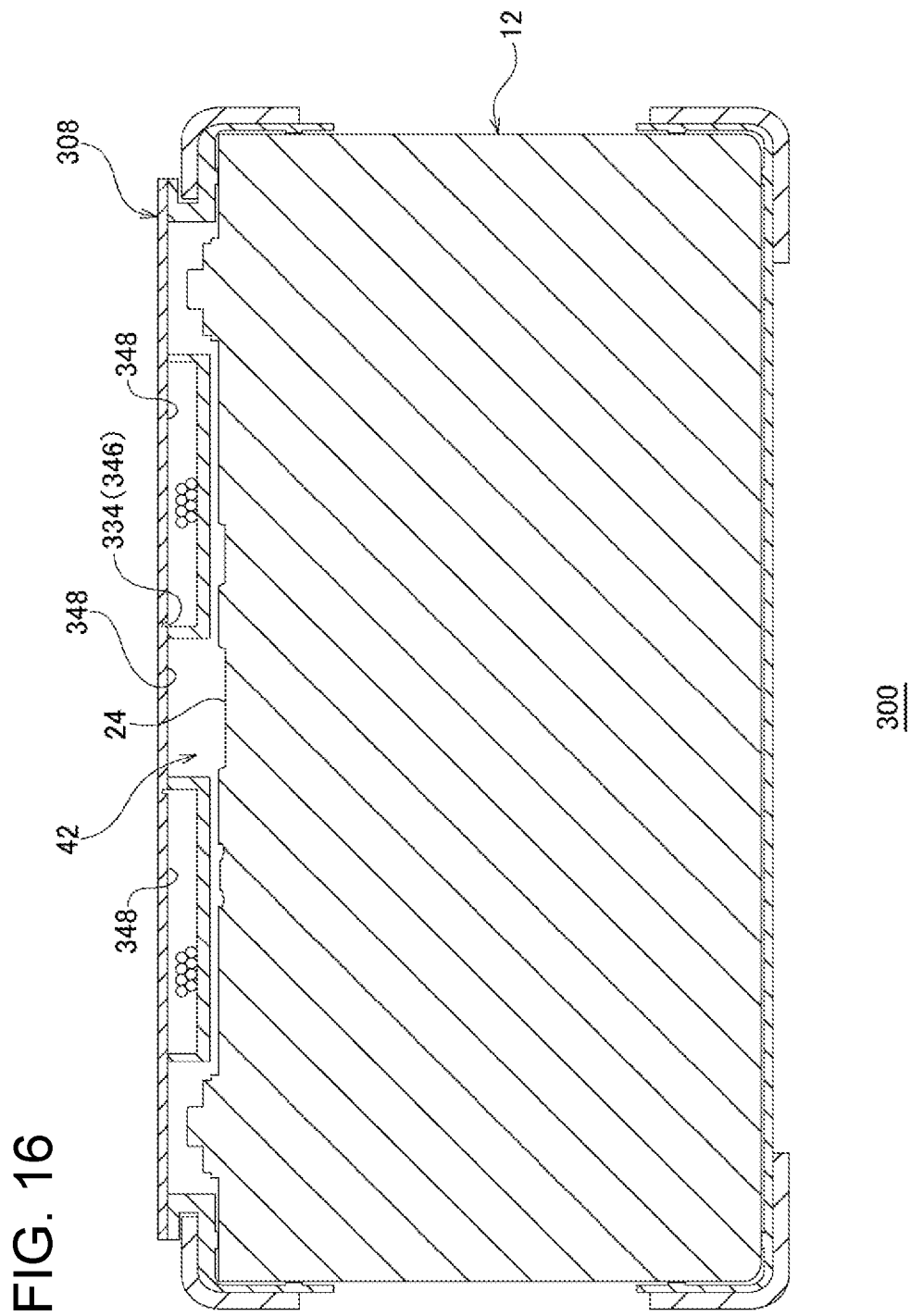
FIG. 16 is a schematic cross-sectional view illustrating a structure of a battery module according to a modification of the exemplary embodiments.

Recess 34, 234 of covering 8, 208 may be designed to more readily rupture by having a locally thinner zone inside recess 34, 234 of covering 8, 208 through a method like cutting an indentation in a predetermined location inside recess 34, 234. As shown in FIG. 16 illustrating battery module 300 according to a modification of the exemplary embodiments, recess 334, i.e. thin-walled part 346, may be made up of an indentation cut in a surface of covering 308. For example, recess 334 made up of an indentation is disposed so as to surround a periphery of valve 24 when viewed along a lamination direction of batteries 12 and covering 308. If gas released from valve 24 is accumulated in space 42, the gas presses thick-walled part 348 disposed face-to-face with valve 24. When the pressure in space 42 exceeds a predetermined level, recess 334 of covering 308 ruptures. This causes separation of thick-walled part 348 surrounded with recess 334 so that an opening is formed at a location of covering 308 face-to-face with valve 24. Gas accumulated in space 42 is released through this opening.

In battery assembly 2 of the first exemplary embodiment described above, separator 14 has first insertion holes 56. In battery assembly 202 of the third exemplary embodiment, end plate 204 has first insertion holes 256. In battery assembly 302 of the fourth exemplary embodiment, bus bar plate 72 has first insertion holes 356. However, first insertion holes may be disposed in any part of the battery assembly other than the structural locations described above. In battery assemblies 2, 202 of the first and the third exemplary embodiments, separator 14 has supports 54. In battery assembly 302 of the fourth exemplary embodiment, bus bar plate 72 has supports 354. However, supports may be disposed on any part of the battery assembly other than the structural locations described above.

In the above-described exemplary embodiments, battery 12 is a prismatic battery. However, in a structure in which a covering has a thin-walled part, a shape of battery 12 is not particularly limited and may be cylindrical, for example. Further, a number of batteries 12 included in battery assembly 2, 202, 302 is not particularly limited. Moreover, exterior can 18 may be covered with an insulating sheet, such as a shrink tube.

Any desired combinations of the above-described components and converted expressions of the present invention in methods, devices, systems, and other similar entities are still effective as aspects of the present invention.

REFERENCE MARKS IN THE DRAWINGS 1, 200, 201, 300, 401: battery module
2, 202, 302: battery assembly
8, 208, 308, 408: covering
12: battery
24: valve
28: opening
30: first barrier
34, 234, 334: recess
40: storage space
46, 246, 346: thin-walled part
48, 248, 348: thick-walled part
244: second barrier
52: fastener
54, 354: support
56, 256, 356: first insertion hole
58, 258: step portion
60, 260, 460: second insertion hole
62, 262: first segment
64, 264: second segment
68, 368: first bent part
68a: end surface
74: second bent part.

The invention claimed is:

1. A battery module comprising:
a battery having a valve on a surface of the battery to release gas produced inside the battery;
a covering put over the surface of the battery,
a partition member disposed between the surface of the battery and the covering, the partition member including an opening disposed at a position corresponding to the valve, and a first barrier projecting toward the covering and surrounding the opening; and
a wire connected to the battery,
wherein the covering includes a thin-walled part disposed at a position corresponding to the valve and a thick-walled part disposed in a region contiguous to the thin-walled part,
wherein the thin-walled part is thinner in thickness than the thick-walled part,
wherein the wire is disposed between the partition member and the thick-walled part,
wherein the first barrier is at least partly disposed between the wire and the valve,
wherein the coveting includes a second barrier projecting toward the surface of the battery and surrounding the thin-walled part, and
wherein the first barrier and the second barrier overlap each other when viewed along a direction perpendicular to a thickness direction of the covering.

2. The battery module according to claim 1, comprising a battery assembly having a plurality of the batteries stacked together,
wherein the covering is put over a surface of the battery assembly; and
the covering includes a plurality of the thin-walled parts disposed at positions corresponding to a plurality of the valves of the batteries.

3. The battery module according to claim 2, further comprising a fastener to fix the covering to the battery assembly,
wherein the battery assembly has a first insertion hole that is designed for insertion of the fastener,
wherein the covering includes a step portion including a first segment extending at a level relatively near to the surface of the battery assembly, and a second segment extending at a level relatively remote from the surface of the battery assembly, and a second insertion hole disposed in the first segment, the second insertion hole being designed for insertion of the fastener, and
wherein the fastener is inserted into both the first insertion hole and the second insertion hole so that the battery assembly and the covering are fixed to each other.

4. The battery module according to claim, wherein the thin walled part is thinner in thickness than the first barrier.

5. The battery module according to claim 1,
wherein the second barrier is at least partly disposed between the wire and the thin-walled part.

6. The battery module according to claim 5, wherein the thin-walled part is thinner in thickness than the second barrier.

7. A battery module comprising:
a battery having a valve on a surface of the battery to release gas produced inside the battery,
a covering put over the surface of the battery,
a partition member disposed between the surface of the battery and the covering, the partition member including an opening disposed at a position corresponding to the valve, and a first barrier projecting toward the covering and surrounding the opening; and
a wire connected to the battery,
wherein the covering includes a thin-wailed part disposed at a position corresponding to the valve and a thick-walled part disposed in a region contiguous to the thin-walled part,
wherein the thin-walled part is thinner in thickness than the thick-walled part,
wherein the wire is disposed between the partition member and the thick-walled part,
wherein the first barrier is at least partly disposed between the wire and the valve,
wherein the thin-walled part is thinner in thickness than the first barrier,
wherein the covering includes a second barrier projecting toward the surface of the battery and surrounding the thin-walled part, and
wherein the first barrier and the second barrier overlap each other when viewed along a direction perpendicular to a thickness direction of the covering.

* * * * *